(12) United States Patent
Kameda et al.

(10) Patent No.: US 10,414,849 B2
(45) Date of Patent: Sep. 17, 2019

(54) PARTIALLY HYDROGENATED BLOCK COPOLYMER, VISCOUS ADHESIVE COMPOSITION, VISCOUS ADHESIVE TAPE, LABEL, MODIFIED ASPHALT COMPOSITION, MODIFIED ASPHALT MIXTURE, AND PAVING BINDER COMPOSITION

(71) Applicant: Asahi Kasei Kabushiki Kaisha, Tokyo (JP)

(72) Inventors: Ippei Kameda, Tokyo (JP); Yoshifumi Araki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 34 days.

(21) Appl. No.: 15/744,357

(22) PCT Filed: Jul. 15, 2016

(86) PCT No.: PCT/JP2016/070952
§ 371 (c)(1),
(2) Date: Jan. 12, 2018

(87) PCT Pub. No.: WO2017/010562
PCT Pub. Date: Jan. 19, 2017

(65) Prior Publication Data
US 2018/0201716 A1    Jul. 19, 2018

(30) Foreign Application Priority Data

Jul. 16, 2015  (JP) ................. 2015-142436

(51) Int. Cl.
| | | |
|---|---|---|
| *C08F 293/00* | (2006.01) | |
| *C09J 7/38* | (2018.01) | |
| *C09J 11/08* | (2006.01) | |
| *C09J 147/00* | (2006.01) | |
| *C09J 125/10* | (2006.01) | |
| *C04B 26/26* | (2006.01) | |
| *C04B 24/28* | (2006.01) | |
| *C08F 8/04* | (2006.01) | |
| *C08L 53/02* | (2006.01) | |
| *C08L 95/00* | (2006.01) | |
| *C08F 297/04* | (2006.01) | |
| *C09J 153/02* | (2006.01) | |
| *C09J 195/00* | (2006.01) | |
| *C04B 111/00* | (2006.01) | |

(52) U.S. Cl.
CPC .......... *C08F 293/005* (2013.01); *C04B 24/28* (2013.01); *C04B 26/26* (2013.01); *C08F 8/04* (2013.01); *C08F 297/044* (2013.01); *C08L 53/02* (2013.01); *C08L 95/00* (2013.01); *C09J 7/381* (2018.01); *C09J 11/08* (2013.01); *C09J 125/10* (2013.01); *C09J 147/00* (2013.01); *C09J 153/025* (2013.01); *C04B 2111/0075* (2013.01); *C08F 2438/00* (2013.01); *C08F 2800/20* (2013.01); *C09J 195/00* (2013.01); *C09J 2203/334* (2013.01); *C09J 2409/00* (2013.01); *C09J 2425/00* (2013.01); *C09J 2453/00* (2013.01)

(58) Field of Classification Search
CPC ............... C04B 24/28; C04B 26/26; C04B 2111/0075; C08F 8/04; C08F 293/005; C08F 297/04; C08F 297/042; C08F 297/044; C08F 297/046; C08F 297/048; C08F 2438/00; C08F 2800/20; C08L 53/02; C08L 95/00; C08L 95/005; C09J 11/08; C09J 125/10; C09J 147/00; C09J 195/00; C09J 195/005; C09J 2203/334; C09J 2409/00; C09J 2425/00; C09J 2453/00; C09J 153/025

See application file for complete search history.

(56) References Cited

U.S. PATENT DOCUMENTS

| | | | |
|---|---|---|---|
| 5,424,356 A | 6/1995 | Parker et al. | |
| 2002/0147274 A1 | 10/2002 | Sasagawa et al. | |
| 2003/0149140 A1 | 8/2003 | Stephens et al. | |
| 2005/0107521 A1 | 5/2005 | Sasagawa et al. | |

(Continued)

FOREIGN PATENT DOCUMENTS

| | | |
|---|---|---|
| CN | 105585809 A | 5/2016 |
| CN | 106317350 A | 1/2017 |
| CN | 106414604 A | 2/2017 |

(Continued)

OTHER PUBLICATIONS

English Machine Translation of JPH08-109219 prepared Apr. 28, 2019. (Year: 2019).*

(Continued)

*Primary Examiner* — Christopher M Rodd
(74) *Attorney, Agent, or Firm* — Morgan, Lewis & Bockius LLP

(57) ABSTRACT

A partially hydrogenated block copolymer of the present invention includes: a polymer block (A) containing a vinyl aromatic monomer unit as a main component: and a polymer block (B) containing a conjugated diene monomer unit, wherein in a differential molecular weight distribution (B) of a degradation product of the partially hydrogenated block copolymer obtained by an ozone degradation method, a distribution of degree of hydrogenation H, which is given by a maximum peak height in a region of a molecular weight of 800 or more and 3,000 or less, is 0.01 to 0.5.

19 Claims, 3 Drawing Sheets

(56) References Cited

U.S. PATENT DOCUMENTS

| | | |
|---|---|---|
| 2011/0034614 A1 | 2/2011 | Nakajima et al. |
| 2017/0088757 A1 | 3/2017 | Nakatani et al. |

FOREIGN PATENT DOCUMENTS

| | | | |
|---|---|---|---|
| EP | 3095802 A1 | | 11/2016 |
| JP | S61-278578 A | | 12/1986 |
| JP | S64-081877 A | | 3/1989 |
| JP | H07-157738 A | | 6/1995 |
| JP | 08109219 A | * | 4/1996 |
| JP | H08-109219 A | | 4/1996 |
| JP | H09-510498 A | | 10/1997 |
| JP | 2002-308926 A | | 10/2002 |
| JP | 2005-126485 A | | 5/2005 |
| JP | 2011-246648 A | | 12/2011 |
| JP | 5059595 B | | 10/2012 |
| JP | 2012-246378 A | | 12/2012 |
| JP | 2016-089171 A | | 5/2016 |
| TW | 200948919 A | | 12/2009 |
| TW | 201226504 A | | 7/2012 |
| WO | 2012/050046 A1 | | 10/2011 |
| WO | 2001/085818 A1 | | 11/2011 |
| WO | 2015/108150 A1 | | 7/2015 |

OTHER PUBLICATIONS

European Search Report issued in corresponding European Patent Application No. 16824542.1 dated Jun. 27, 2018.
International Preliminary Report on Patentability and Written Opinion issued in corresponding International Patent Application No. PCT/JP2016/070952 dated Jan. 25, 2018.
International Search Report issued in corresponding International Patent Application No. PCT/JP2016/070952 dated Aug. 30, 2016.
Allen et al., "Influence of ozone on styrene-ethylene-butylene-styrene (SEBS) copolymer," Polymer Degradation and Stability, 79: 297-307 (2003).

* cited by examiner

PARTIALLY HYDROGENATED BLOCK COPOLYMER, VISCOUS ADHESIVE COMPOSITION, VISCOUS ADHESIVE TAPE, LABEL, MODIFIED ASPHALT COMPOSITION, MODIFIED ASPHALT MIXTURE, AND PAVING BINDER COMPOSITION

TECHNICAL FIELD

The present invention relates to a partially hydrogenated block copolymer, a viscous adhesive composition, a viscous adhesive tape, a label, a modified asphalt composition, a modified asphalt mixture, and a paving binder composition.

BACKGROUND ART

Block copolymers are widely used for viscous adhesive compositions, asphalt compositions, paving binder compositions, and the like.

In recent years, hot melt type viscous adhesive compositions have become to be widely used as viscous adhesive compositions from the perspective of reducing environmental contamination and improving the labor environment. Generally, hot melt type viscous adhesive compositions comprise a block copolymer. Examples of such a block copolymer include a block copolymer comprising a vinyl aromatic monomer unit and a conjugated diene monomer unit.

For example, Patent Literatures 1 and 2 describe viscous adhesive compositions that use, as a block copolymer, a tri-block copolymer and a di-block copolymer of styrene and butadiene.

Patent Literature 3 describes a viscous adhesive composition that uses a hydrogenated block copolymer of styrene and butadiene. In the Examples and Comparative Examples of Patent Literature 3, viscous adhesive compositions are described that comprise a hydrogenated block copolymer of styrene and butadiene, a tackifier, and an oil in various blending ratios.

Patent Literature 4 describes a viscous adhesive composition comprising a block copolymer of styrene and butadiene, and a tackifier resin, in which as the block copolymer of styrene and butadiene, a viscous adhesive composition comprising a partially hydrogenated block copolymer and a non-hydrogenated block copolymer in combination; and a viscous adhesive composition comprising a partially hydrogenated block copolymer and a completely hydrogenated block copolymer in combination, are described.

On the other hand, in the technical field of asphalt compositions, modified asphalt compositions which are obtained by adding various block copolymer as a modifying agent to an asphalt composition are widely used in order to impart a performance in accordance with the application of the asphalt composition, such as for road paving, soundproof sheeting, asphalt roofing, and the like. As the block copolymer used for such a modifying agent, for example, a block copolymer comprising a conjugated diene monomer unit and a vinyl aromatic monomer unit is used.

For example, Patent Literatures 5 to 7 describe a modified asphalt composition comprising a hydrogenated block polymer obtained by copolymerizing a conjugated diene monomer and a vinyl aromatic monomer.

Further, a paving binder composition may be coated on paving of sidewalks, roads, parks, and the like for design reasons, clarification of demarcations, road signage, slip prevention, and the like. Paving binder compositions generally comprise a block copolymer, a tackifier resin, and an oil, and are provided with color by further comprising a colorant, such as a pigment.

For example, Patent Literature 8 describes a color paving binder composition obtained by heating and mixing a non-aromatic heavy mineral oil, a petroleum resin, a thermoplastic elastomer, an ethylene copolymer, and a separation inhibitor of a bipolar type polymer compound.

CITATION LIST

Patent Literatures

Patent Literature 1: Japanese Patent Laid-Open No. 64-81877
Patent Literature 2: Japanese Patent Laid-Open No. 61-278578
Patent Literature 3: WO 2001/85818 A
Patent Literature 4: Japanese Patent Laid-Open No. 7-157738
Patent Literature 5: Japanese Patent Laid-Open No. 2005-126485
Patent Literature 6: U.S. Patent Application Publication No. 2003/0149140
Patent Literature 7: Japanese Patent Laid-Open No. 2012-246378
Patent Literature 8: Japanese Patent No. 5059595

SUMMARY OF INVENTION

Technical Problem

Viscous adhesive compositions need to have a high tackiness, a high tack strength, a high tack holding power, a high heat discoloration resistance during production of the viscous adhesive composition, and the like. Further, modified asphalt compositions need to have a high softening point, a high low-temperature ductility, a low melt viscosity, a high rutting resistance, excellent low-temperature bending properties, a high heat resistance stability during storage of the modified asphalt composition, and the like. In addition, paving binder compositions need to have a high softening point, a high low-temperature ductility, a low melt conductance, a high rutting resistance, a high heat resistance stability during storage of the paving binder composition, a high heat discoloration resistance during production of the paving binder composition, and the like. However, the techniques described in Patent Literatures 1 to 8 are not capable of sufficiently meeting those demands.

The present invention has been conceived in view of the problems of the conventional art described above, and an object of the present invention is to provide a partially hydrogenated block copolymer capable of imparting various good physical properties when used in a viscous adhesive composition, a modified asphalt composition, or a paving binder composition, for example. In addition, it is an object of the present invention to provide a viscous adhesive composition, a viscous adhesive tape, a label, a modified asphalt composition, a modified asphalt mixture, and a paving binder composition that comprise the above partially hydrogenated block copolymer.

Solution to Problem

The inventors conducted diligent research in order to solve the problems described above. As a result, the inventors found that partially hydrogenated block copolymer having a specific distribution of degree of hydrogenation could solve the problems described above, thereby accomplishing the present invention.

The present invention is as set forth below.

[1]

A partially hydrogenated block copolymer comprising: a polymer block (A) comprising a vinyl aromatic monomer unit as a main component; and a polymer block (B) comprising a conjugated diene monomer unit, wherein in a differential molecular weight distribution (B) of a degradation product of the partially hydrogenated block copolymer obtained by an ozone degradation method, a distribution of degree of hydrogenation H, which is given by a maximum peak height in a region of a molecular weight of 800 or more and 3,000 or less, is 0.01 to 0.5.

[2]

The partially hydrogenated block copolymer according to [1], wherein in a differential molecular weight distribution (D) obtained by subtracting, from the differential molecular weight distribution (B), a differential molecular weight distribution (C) of a degradation product of the partially hydrogenated block copolymer obtained by an osmic acid degradation method, a distribution of degree of hydrogenation H2, which is given by a maximum peak height based on a total area in a region of a molecular weight of 200 or more and 1,000,000 or less, is 0.001 to 0.007.

[3]

The partially hydrogenated block copolymer according to [1] or [2], wherein the partially hydrogenated block copolymer has a degree of hydrogenation of 95 mol % or less based on a total number of moles of the conjugated diene monomer unit.

[4]

The partially hydrogenated block copolymer according to any of [1] to [3], wherein the partially hydrogenated block copolymer has a degree of hydrogenation of 10 mol % or more based on a total number of moles of the conjugated diene monomer unit.

[5]

The partially hydrogenated block copolymer according to any of [1] to [4], wherein L2/L1 is less than 0.02, wherein L1 is a length of a perpendicular L drawn to a baseline from an apex of a peak that is a peak in a differential molecular weight distribution (A) of the partially hydrogenated polymer and that corresponds to a maximum molecular weight component, and L2 is a distance on the perpendicular L between the baseline and an intersection where the differential molecular weight distribution (B) intersects the perpendicular L when the differential molecular weight distribution (B) is superimposed on the differential molecular weight distribution (A).

[6]

The partially hydrogenated block copolymer according to any of [1] to [5], wherein the partially hydrogenated block copolymer has a vinyl aromatic monomer unit content of 10 to 60% by mass.

[7]

The partially hydrogenated block copolymer according to any of [1] to [6], wherein the partially hydrogenated block copolymer comprises a partially hydrogenated block copolymer (d1) comprising: one polymer block (A1) comprising a vinyl aromatic monomer unit as a main component; and one polymer block (B1) comprising a conjugated diene monomer unit as a main component.

[8]

The partially hydrogenated block copolymer according to [7], wherein a content of the partially hydrogenated block copolymer (d1) is 20 to 80% by mass based on 100% by mass of the partially hydrogenated block copolymer.

[9]

The partially hydrogenated block copolymer according to [7] or [8], wherein the partially hydrogenated block copolymer comprises a partially hydrogenated block copolymer (r1) having a radial structure.

[10]

A viscous adhesive composition comprising 100 parts by mass of the partially hydrogenated block copolymer according to any of [1] or [9] and 20 to 400 parts by mass of a tackifier resin.

[11]

A viscous adhesive tape comprising the viscous adhesive composition according to [10].

[12]

A label comprising the viscous adhesive composition according to [10].

[13]

The partially hydrogenated block copolymer according to [1] to [6], wherein the partially hydrogenated block copolymer comprises a partially hydrogenated block copolymer (d2) comprising: a polymer block (A) comprising a vinyl aromatic monomer unit as a main component; and a copolymer block (B2) comprising a conjugated diene monomer unit and a vinyl aromatic monomer unit.

[14]

The partially hydrogenated block copolymer according to [13], wherein the partially hydrogenated block copolymer has a weight average molecular weight (Mw) of 100,000 to 500,000.

[15]

The partially hydrogenated block copolymer according to [13] or [14], wherein a peak temperature of a loss tangent (tan δ) obtained by dynamic viscoelasticity measurement of the partially hydrogenated block copolymer is −50° C. or more and −5° C. or less.

[16]

The partially hydrogenated block copolymer according to any of [13] to [15], wherein a peak temperature of a loss tangent (tan δ) obtained by dynamic viscoelasticity measurement of the partially hydrogenated block copolymer is −50° C. or more and −5° C. or less, and a peak height value thereof is more than 0.7 and 1.6 or less.

[17]

A modified asphalt composition comprising 1 part by mass or more and 20 parts by mass or less of the partially hydrogenated block copolymer according to any of [1] to [6] and [13] to [16], based on 100 parts by mass of asphalt.

[18]

A modified asphalt mixture comprising the modified asphalt composition according to [17] and an aggregate.

[19]

A paving binder composition comprising:
20 to 70% by mass of a tackifier resin;
20 to 70% by mass of oil; and
2 to 15% by mass of the partially hydrogenated block copolymer according to any of [1] to [6] and [13] to [16].

Advantageous Effect of the Invention

The partially hydrogenated block copolymer of the present invention is capable of imparting various good physical properties when used in a viscous adhesive composition, a modified asphalt composition, or a paving binder composition, for example. More specifically, a viscous adhesive composition, a modified asphalt composition, and a paving binder composition having good physical properties can be provided.

DESCRIPTION OF EMBODIMENTS

Figure 1:
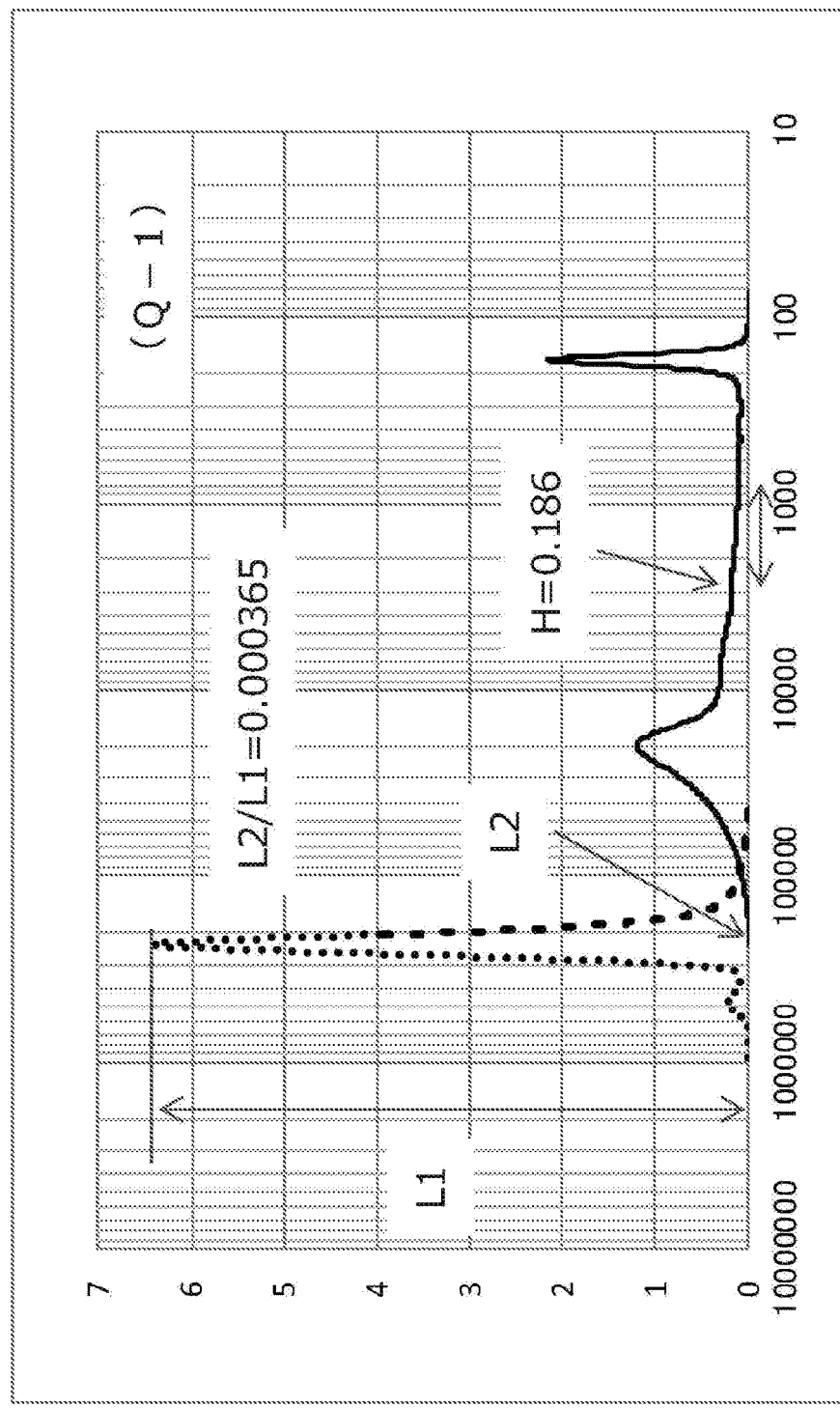
FIG. 1 illustrates a graph showing the result of measuring the molecular weight distribution of a partially hydrogenated block copolymer Q-1 obtained in Example.

Below, an embodiment for carrying out the present invention (hereinafter referred to as "the present embodiment") will be described in detail. The present invention is not limited to the embodiments below, and various modifications can be made within the scope of the present invention to carry out the invention.

<Partially Hydrogenated Block Copolymer>

The partially hydrogenated block copolymer of the present embodiment comprises: a polymer block (A) comprising a vinyl aromatic monomer unit as a main component; and a polymer block (B) comprising a conjugated diene monomer unit. In a differential molecular weight distribution (B) of a degradation product of the partially hydrogenated block copolymer obtained by an ozone degradation method, a distribution of degree of hydrogenation H, which is given by a maximum peak height in a region of a molecular weight of 800 or more and 3,000 or less, is 0.01 to 0.5. Being configured as described above, the partially hydrogenated block copolymer of the present embodiment is capable of imparting various good physical properties when used as a viscous adhesive composition, a modified asphalt composition, and a paving binder composition, for example. Specifically, when used as a viscous adhesive composition, the viscous adhesive composition has excellent heat discoloration resistance during production, high tackiness, a high tack strength, and a high tack holding power. Further, when used as a modified asphalt composition, the modified asphalt composition has excellent heat resistance stability during storage, a high softening point, a high low-temperature ductility, a low melt viscosity, a high rutting resistance, and excellent low-temperature bending properties. In addition, when used as a paving binder composition, the paving binder composition has excellent heat discoloration resistance during production, excellent heat resistance stability during storage, a high softening point, a high low-temperature ductility, a low melt viscosity, and a high rutting resistance.

In the present embodiment, the "distribution of degree of hydrogenation H" is an index of the distribution of the degree of hydrogenation of the partially hydrogenated block copolymer. The distribution of degree of hydrogenation H can be calculated in the following manner.

H represents a maximum peak height in a region of a molecular weight of 800 or more and 3,000 or less in a differential molecular weight distribution (B) of a degradation product of the partially hydrogenated block copolymer obtained by an ozone degradation method.

The value of H is an index of the distribution of degree of hydrogenation for a molecular weight of 800 or more and 3,000 or less. The smaller H value indicates, the broader the distribution of degree of hydrogenation. According to investigations by the inventors, the distribution of degree of hydrogenation for a molecular weight of 800 or more and 3,000 or less influences the physical properties of the viscous adhesive composition, the modified asphalt composition, and the paving binder composition. Measurement of the differential molecular weight distribution by an ozone degradation method can be carried out by using the method described in the Examples, which are described below.

The distribution of degree of hydrogenation H of the partially hydrogenated block copolymer may be 0.01 or more and 0.5 or less, preferably 0.05 or more and 0.45 or less, and more preferably 0.1 or more and 0.4 or less. It is noted that the distribution of degree of hydrogenation H can be adjusted, for example, by multi-stage addition of a polar compound or a randomizing agent in the polymerization step (described below), by a continuous hydrogenation method in which a plurality of polymer supply ports to a reactor are arranged in the hydrogenation step, by adjusting the retention time and the stirring conditions during continuous hydrogenation, and by blending the partially hydrogenated block copolymer.

As a result of diligent research, the inventors found that when a distribution of degree of hydrogenation H of a partially hydrogenated block copolymer is 0.01 or more and 0.5 or less, the tack strength, tackiness, tack holding power, and heat discoloration resistance during production of a viscous adhesive composition can be improved, the softening point, low-temperature ductility, melt viscosity, rutting resistance, low-temperature bending properties, and heat resistance stability during storage of a modified asphalt composition can be improved, and the softening point, low-temperature ductility, melt conductance, rutting resistance, heat resistance stability during storage, and heat discoloration resistance during production of a paving binder composition can be improved. The reasons for this are considered to be, although not limited to, due to the fact that a broad distribution of degree of hydrogenation enables a broader solubility parameter of a middle block, and improves compatibility with various blending agents.

In the present specification, the units forming the block copolymer are referred to as ". . . monomer units". When describing the materials of the polymer, the term "unit" is omitted, and the materials are simply referred to as ". . . monomer". Further, in the present specification, "comprising . . . as a main component" means that the content of a predetermined monomer unit is 70% by mass or more of the block. For the polymer block comprising a vinyl aromatic monomer unit as a main component, the content of the predetermined monomer unit may be 70% by mass or more, preferably 80% by mass or more, and more preferably 90% by mass or more. Further, in the present specification, "conjugated diene monomer" includes conjugated diene monomers that have been hydrogenated.

In the present embodiment, examples of the pre-hydrogenated structure of the partially hydrogenated block copolymer include, but are not particularly limited to, structures represented by the following formulae (1) to (6).

$(A-B)_n$        (1)

$B-(A-B)_n$        (2)

$A-(B-A)_n$        (3)

$A-(B-A)_n-X$        (4)

$$[(A-B)_k]_m\text{-}X \quad (5)$$

$$[(A-B)_k\text{-}]_m\text{-}X \quad (6)$$

In the above formulae (1) to (6), A represents a polymer block comprising a vinyl aromatic monomer unit as a main component, B represents a polymer block comprising a conjugated diene monomer unit, X represents a residue of a coupling agent or a residue of polymerization initiators such as a polyfunctional organolithium, and m, n, and k each represents an integer of 1 or greater and preferably an integer of 1 to 5.

When there are a plurality of polymer blocks (A) and (B) in the block copolymer before hydrogenation, those polymer blocks may each have the same structure, such as molecular weight and composition, or have a different structure. The partially hydrogenated block copolymer may also be a mixture of: a coupling form, in which X is a residue of a coupling agent; and a non-coupling form, in which X is absent or is a residue of a polymerization initiator. It is not necessary for the boundary or the end moiety of each block to be clearly distinguished. For example, a copolymer block of a vinyl aromatic monomer unit and a conjugated diene monomer unit may be present.

The distribution of the vinyl aromatic monomer unit in the polymer block (A) comprising a vinyl aromatic monomer unit as a main component and in the polymer block (B) comprising a conjugated diene monomer unit is not especially limited, and may be a uniform distribution or may be a tapered, step-wise, convex or concave distribution. A crystal portion may be present in the polymer block. In the polymer block (A) comprising a vinyl aromatic monomer unit as a main component, a plurality of segments each comprising a different vinyl aromatic monomer unit content may coexist.

Examples of the conjugated diene monomer unit include, but are not particularly limited to, a conjugated diene monomer unit derived from 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Of these, a conjugated diene monomer unit derived from 1,3-butadiene and isoprene is preferable. A conjugated diene monomer unit derived from 1,3-butadiene is more preferable. One kind of conjugated diene monomer unit may be used alone, or two or more kinds of conjugated diene monomer unit may be used in combination.

Examples of the vinyl aromatic monomer unit include, but are not particularly limited to, a vinyl aromatic monomer unit derived from styrene, α-methylstyrene, p-methylstyrene, divinylbenzene, 1,1-diphenylethylene, N,N-dimethyl-p-aminoethylstyrene, and N,N-diethyl-p-aminoethylstyrene. Of these, from an economic perspective, a vinyl aromatic monomer unit derived from styrene is preferable. One kind of vinyl aromatic monomer unit may be used alone, or two or more kinds of vinyl aromatic monomer unit may be used in combination.

In the present embodiment, "partially hydrogenated" means that a degree of hydrogenation of the conjugated diene is more than 0 mol % and 97 mol % or less based on the total number of moles of the conjugated diene monomer unit. The degree of hydrogenation of the partially hydrogenated block copolymer may be any value within this range.

In the present embodiment, from the perspective of the viscosity of the viscous adhesive composition, the modified asphalt composition, and the paving binder composition, the upper limit of the degree of hydrogenation of the partially hydrogenated block copolymer is, based on the total number of moles of the conjugated diene monomer unit, preferably 95 mol % or less, more preferably 93 mol % or less, and even more preferably 90 mol % or less.

In the present embodiment, from the perspective of the heat resistance stability of the viscous adhesive composition, the modified asphalt composition, and the paving binder composition, the lower limit of the degree of hydrogenation of the partially hydrogenated block copolymer is, based on the total number of moles of the conjugated diene monomer unit, preferably 10 mol % or more, more preferably 15 mol % or more, and even more preferably 20 mol % or more.

The degree of hydrogenation of the partially hydrogenated block copolymer can be adjusted by controlling the hydrogenation amount and the hydrogenation reaction time in the hydrogenation step, which is described later. Further, the degree of hydrogenation can be calculated by using the method described in the Examples, which are described below.

Further, in a differential molecular weight distribution (D) obtained by subtracting, from the differential molecular weight distribution (B), a differential molecular weight distribution (C) of a degradation product of the partially hydrogenated block copolymer obtained by an osmic acid degradation method, a distribution of degree of hydrogenation H2, which is given by a maximum peak height based on a total area in a region of a molecular weight of 200 or more and 1,000,000 or less, is preferably 0.001 to 0.007.

The value of H2 is an index of the distribution of degree of hydrogenation in the region of a molecular weight of 200 or more and 1,000,000 or less. The smaller H2 value indicates, the broader the distribution of degree of hydrogenation in this molecular weight region. Measurement of the molecular weight distribution by an ozone degradation method and measurement of the molecular weight distribution by an osmic acid degradation method are described in the Examples section of the present specification.

H2 is an index of the distribution of degree of hydrogenation and an intermediate random styrene distribution. When H2 is in the range of 0.001 to 0.007, the long-term performance stability of the viscous adhesive composition, the modified asphalt composition, and the paving binder composition tends to be improved. From the same perspective, H2 is more preferably 0.001 or more and 0.0055 or less, and even more preferably 0.001 or more and 0.004 or less. The distribution of degree of hydrogenation H2 can be adjusted based on, for example, the continuous hydrogenation method and the retention time, the stirring conditions, and the partially hydrogenated block copolymer blend during continuous hydrogenation in the hydrogenation step (described below).

In addition, when L1 is a length of a perpendicular L drawn to a baseline from an apex of a peak that is a peak in a differential molecular weight distribution (A) of the partially hydrogenated block copolymer and that corresponds to a maximum molecular weight component, and L2 is a distance on the perpendicular L between the baseline and an intersection where the differential molecular weight distribution (B) intersects the perpendicular L when the differential molecular weight distribution (B) is superimposed on the differential molecular weight distribution (A), L2/L1 is preferably less than 0.02, more preferably less than 0.018, and even more preferably less than 0.015.

When L2/L1 is less than 0.02, this represents the fact that there are few components having a degree of hydrogenation of 100%, and means not only that the distribution of degree of hydrogenation is broad, but also that there are less high-viscosity components, and that the balance between viscosity and the various other physical properties is excellent.

The differential molecular weight distribution (A) and the differential molecular weight distribution (B) can be measured by using the method described in the Examples, which are described later.

In the present embodiment, from the perspective of the viscosity of the viscous adhesive composition, the modified asphalt composition, and the paving binder composition, the content of the vinyl aromatic monomer unit in the partially hydrogenated block copolymer is preferably 10 to 60% by mass, more preferably 13 to 58% by mass, and even more preferably 15 to 55% by mass.

<Method of Producing Partially Hydrogenated Block Copolymer>

The method of producing the partially hydrogenated block copolymer is not particularly limited. The partially hydrogenated block copolymer can be produced by, for example, performing a polymerization step for obtaining a block copolymer comprising: a polymer block (A) comprising a vinyl aromatic monomer unit as a main component; and a polymer block (B) comprising a conjugated diene monomer unit; by polymerizing at least a conjugated diene monomer and a vinyl aromatic monomer in a hydrocarbon solvent using a lithium compound as a polymerization initiator, performing after the polymerization step a hydrogenation step for hydrogenating a part of the double bonds in the conjugated diene monomer unit of the obtained block copolymer obtained in the polymerization step, and then performing a solvent-removing step for removing the solvent of the solution including the obtained partially hydrogenated block copolymer.

Performing the hydrogenation step after the polymerization step based on a continuous method (hereinafter referred to as "continuous hydrogenation"), arranging a plurality of supply ports for the polymer to be supplied into the reactor during continuous hydrogenation, adjusting the retention time and the stirring conditions, and blending the partially hydrogenated block copolymer each make it easier to adjust the distribution of degree of hydrogenation H to 0.01 or more and 0.5 or less, the distribution of degree of hydrogenation H2 to 0.001 or more and 0.007 or less, and L2/L1 to less than 0.02.

The arrangement of the plurality of supply ports for the polymer to be supplied into the reactor during continuous hydrogenation is not particularly limited. For example, the plurality of supply ports may be arranged such that 80% of the total amount of the polymer is continuously supplied from an upper portion of the reactor, 20% of the total is continuously supplied from a middle portion of the reactor, and the all of the polymer after the hydrogenation reaction is continuously extracted from a lower portion of the reactor.

The retention time and the stirring conditions during continuous hydrogenation are not particularly limited. For example, in a state in which the hydrogen pressure is preferably 0.1 MPa to 5.0 MPa, and more preferably 0.3 MPa to 4.0 MPa, setting the mean retention time to preferably 5 minutes to 3 hours, and more preferably 10 minutes to 2 hours, makes it easier to adjust the distribution of degree of hydrogenation H to 0.01 or more and 0.5 or less, the distribution of degree of hydrogenation H2 to 0.001 or more and 0.007 or less, and L2/L1 to less than 0.02. Further, the distribution of degree of hydrogenation H can be adjusted to 0.01 or more and 0.5 or less, the distribution of degree of hydrogenation H2 can be adjusted to 0.001 or more and 0.007 or less, and L2/L1 can be adjusted to less than 0.02 based on the number and the shape of the stirring blades. It is noted that H and H2 tend to increase and L2/L1 tends to decrease when the hydrogen pressure is increased and the mean retention time is shortened. Conversely, H and H2 tend to decrease and L2/L1 tends to increase when the hydrogen pressure is decreased and the mean retention time is lengthened.

Blend forms of the partially hydrogenated block copolymer can be obtained by, but are not particularly limited to, changing the conditions of the continuous hydrogenation or carrying out batch-wise hydrogenation to obtain a partially hydrogenated block copolymer having two or more distribution of degree of hydrogenations, and then mixing each of those under wet or dry conditions.

In the polymerization step, for example, the block copolymer can be obtained by polymerizing monomers including at least a conjugated diene monomer and a vinyl aromatic monomer in a hydrocarbon solvent using a lithium compound as a polymerization initiator.

Examples of the hydrocarbon solvent to be used in the polymerization step include, but are not particularly limited to, aliphatic hydrocarbons such as butane, pentane, hexane, isopentane, heptane and octane; alicyclic hydrocarbons such as cyclopentane, methylcyclopentane, cyclohexane, methylcyclohexane and ethylcyclohexane; and aromatic hydrocarbons such as benzene, toluene, ethylbenzene, and xylene. These may be used alone or by mixing two or more kinds thereof.

Examples of lithium compounds to be used as the polymerization initiator in the polymerization step include, but are not particularly limited to, compounds having one or more lithium atoms in a molecule, for example, an organic monolithium compound, an organic dilithium compound, and an organic polylithium compound. Examples of such organolithium compounds include, but are not particularly limited to, ethyl lithium, n-propyl lithium, isopropyl lithium, n-butyl lithium, sec-butyl lithium, tert-butyl lithium, hexamethylene dilithium, butadienyl dilithium, isoprenyl dilithium, and the like. These may be used alone or in combination of two or more.

Examples of the conjugated diene monomer include, but are not particularly limited to, diolefins having a pair of conjugated double bonds, such as 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Of these, 1,3-butadiene and isoprene are preferable. From the perspective of mechanical strength, 1,3-butadiene is more preferable. These may be used alone or in combination of two or more.

Examples of the vinyl aromatic monomer include, but are not particularly limited to, vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene. Of these, from an economic perspective, styrene is preferable. These may be used alone or in combination of two or more.

In addition to the above-described conjugated diene monomers and vinyl aromatic monomers, other monomers capable of copolymerizing with the conjugated diene monomers and vinyl aromatic monomers can also be used.

In the polymerization step, in order to, for example, adjust the polymerization rate, adjust the micro structure of the polymerized conjugated diene monomer unit (ratio of cis, trans, and vinyl), and adjust the reaction ratio of the conjugated diene monomer and the vinyl aromatic monomer, a polar compound or a randomizing agent may also be used. In order to reduce the distribution of degree of hydrogenation H, the distribution of degree of hydrogenation H2, and L2/L1, it is preferable to add a polar compound or a randomizing agent in multiple stages.

Examples of the polar compound and the randomizing agent include, but are not particularly limited to, ethers such as tetrahydrofuran, diethylene glycol dimethyl ether, and diethylene glycol dibutyl ether; amines such as triethylamine, N,N,N',N'-tetramethylethylenediamine (hereinafter also referred to as "TMEDA"); thioethers, phosphines, phosphoramides, alkyl benzene sulfonate, and alkoxides of potassium or sodium.

Examples of the polymerization method to be carried out in the polymerization step of the block copolymer include, but are not particularly limited to, known methods. Examples of known methods include the methods described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 56-28925, Japanese Patent Laid-Open No. 59-166518, Japanese Patent Laid-Open No. 60-186577, and the like.

The block copolymer may be coupled using a coupling agent. As the coupling agent, which is not particularly limited, any bifunctional or more coupling agent can be used. Examples of bifunctional coupling agents include, but are not particularly limited to, bifunctional halogenated silanes such as dichlorosilane, monomethyldichlorosilane, and dimethyldichlorosilane; bifunctional alkoxysilanes such as diphenyldimethoxysilane, diphenyldiethoxysilane, dimethyldimethoxysilane, and dimethyldiethoxysilane; bifunctional halogenated alkanes such as dichloroethane, dibromoethane, methylene chloride, and dibromomethane; bifunctional halogenated tins such as tin dichloride, monomethyltin dichloride, dimethyltin dichloride, monoethyltin dichloride, diethyltin dichloride, monobutyltin dichloride, and dibutyltin dichloride; and dibromobenzene, benzoic acid, CO, and 2-chloropropene.

Examples of trifunctional coupling agents include, but are not particularly limited to, trifunctional halogenated alkanes such as trichloroethane and trichloropropane; trifunctional halogenated silanes such as methyl trichlorosilane and ethyl trichlorosilane; and trifunctional alkoxysilanes such as methyltrimethoxysilane, phenyltrimethoxysilane, and phenyltriethoxysilane.

Examples of tetrafunctional coupling agents include, but are not particularly limited to, tetrafunctional halogenated alkanes such as carbon tetrachloride, carbon tetrabromide, and tetrachloroethane; tetrafunctional halogenated silanes such as tetrachlorosilane and tetrabromosilane; tetrafunctional alkoxysilanes such as tetramethoxysilane and tetraethoxysilane; and tetrafunctional halogenated tins such as tin tetrachloride and tin tetrabromide.

Examples of penta- or higher functional coupling agents include, but are not particularly limited to, polyhalogenated hydrocarbon compounds such as 1,1,1,2,2-pentachloroethane, perchloroethane, pentachlorobenzene, perchlorobenzene, octabromodiphenyl ether, and decabromodiphenyl ether. Other than these, epoxidized soybean oil, bi-to hexafunctional epoxy group-containing compounds, carboxylic acid esters, and polyvinyl compounds such as divinyl benzene can be used. The coupling agents may be used alone or in combination of two or more.

After the polymerization step, it is preferable to carry out an inactivation step for inactivating an active end of the block copolymer. The active end of a polymer can be inactivated by reacting the active end with a compound having an active hydrogen. Examples of compounds having an active hydrogen include, but are not particularly limited to, from an economic perspective, alcohol, water, and the like.

In the hydrogenation step, hydrogens are added to a part of the double bonds in the conjugated diene monomer unit of the block copolymer obtained in the polymerization step. Examples of a hydrogenation catalyst used in the hydrogenation step include, but are not particularly limited to, heterogeneous supported catalysts in which a metal such as Ni, Pt, Pd, and Ru is supported by a carrier such as carbon, silica, alumina and diatomaceous earth; so-called Ziegler catalysts using an organic salt or an acetylacetone salt of Ni, Co, Fe, or Cr and a reducing agent such as organic Al; so-called organic complex catalysts such as organometallic compounds of Ru or Rh, for example; and homogeneous catalysts using a titanocene compound in combination with a reducing agent such as organic Li, organic Al, and organic Mg. Of these, from an economic perspective and from the standpoint of the colorability or adhesion strength of the polymer, a homogeneous catalyst using a titanocene compound in combination with a reducing agent such as organic Li, organic Al, and organic Mg is preferable.

Examples of the hydrogenation method include, but are not particularly limited to, the methods described in Japanese Patent Publication No. 42-8704 and Japanese Patent Publication No. 43-6636, and the methods described in Japanese Patent Publication No. 63-4841 and Japanese Patent Publication No. 63-5401 are preferable. More specifically, a partially hydrogenated block copolymer solution can be obtained by performing the hydrogenation step in an inert solvent in the presence of a hydrogenation catalyst. From the perspective of a high hydrogenation activity, it is preferable to carry out the hydrogenation step after the inactivation step. The hydrogenation step may be carried out by a batch method, a continuous method, or a combination thereof. The hydrogenation method is preferably a continuous method, as such a method facilitates controlling the value of the distribution of degree of hydrogenation H of the partially hydrogenated block copolymer to be in the range of 0.01 or more and 0.5 or less, the value of the distribution of degree of hydrogenation H2 to 0.001 or more and 0.007 or less, and L2/L1 to be less than 0.02. Further, from the perspective of reducing L1/L2 even more, a batch method is preferable.

In addition, from the perspective of more easily controlling the distribution of degree of hydrogenation to be in the range of 0.01 or more and 0.5 or less, it is preferable to arrange a plurality of supply ports for supplying the polymer solution after the inactivation step to the reactor. In other words, in a preferred mode, the hydrogenation catalyst and the inert solvent are filled into a reactor having a plurality of supply ports, and while continuously supplying hydrogen, the polymer solution is supplied from the plurality of supply ports.

In the hydrogenation step, the conjugated bonds of the vinyl aromatic monomer unit may be hydrogenated. An upper limit of the degree of hydrogenation of the conjugated bonds in all the vinyl aromatic monomer units can be set to, for example, 30 mol % or less, 10 mol % or less, or 3 mol % or less, based on the total amount of unsaturated groups in the vinyl aromatic. A lower limit can be set to, for example, 0.1 mol % or more. The lower limit may also be 0 mol %.

It is preferable that at least one functional group selected from the group consisting of a hydroxyl group, an acid anhydride group, an epoxy group, an amino group, an amide group, a silanol group, and an alkoxysilane group be added to the partially hydrogenated block copolymer to be obtained, by using a compound having at least one functional group selected from the group consisting of a hydroxyl group, an acid anhydride group, an epoxy group, an amino group, an amide group, a silanol group, and an alkoxysilane group as a polymerization initiator, a monomer, a coupling agent, or a terminator.

As a polymerization initiator containing a functional group, a polymerization initiator containing a nitrogen-containing group is preferable. Examples of a polymerization initiator containing a nitrogen-containing group include, but are not limited to, dioctylaminolithium, di-2-ethylhexy-laminolithium, ethylbenzylaminolithium, (3-(dibutylamino)-propyl)lithium, and piperidinolithium.

As a monomer containing a functional group, a monomer containing a nitrogen-containing group is preferable. Examples of a monomer containing a nitrogen-containing group include, but are not limited to, N,N-dimethyl-vinylbenzylamine, N,N-diethyl-vinylbenzylamine, N,N-dipropyl-vinyl benzylamine, N,N-dibutyl-vinylbenzyl amine, N,N-diphenyl-vinylbenzylamine, 2-dimethylaminoethylstyrene, 2-diethylaminoethylstyrene, 2-bis(trimethylsilyl)aminoethystyrene, 1-(4-N,N-dimethylaminophenyl)-1-phenylethylene, N,N-dimethyl-2-(4-vinylbenzyloxy) ethylamine, 4-(2-pyrrolidinoethyl)styrene, 4-(2-piperidinoethyl)styrene, 4-(2-hexamethyleneiminoethyl) styrene, 4-(2-morpholinoethyl)styrene, 4-(2-thiazinoethyl) styrene, 4-(2-N-methylpiperazinoethyl) styrene, 1-((4-vinylphenoxy)methyl)pyrrolidine, and 1-(4-vinylbenzyloxymethyl)pyrrolidine.

Examples of a coupling agent and a terminator containing a functional group include, among the aforementioned coupling agents and terminators, coupling agents and terminators including at least one function group selected from the group consisting of a hydroxyl group, an acid anhydride group, an epoxy group, an amino group, an amide group, a silanol group, and an alkoxysilane group.

Of them, coupling agents and terminators containing a nitrogen-containing group or an oxygen-containing group are preferable. Examples of coupling agents and terminators containing a nitrogen-containing group or an oxygen-containing group include, but are not limited to, N,N,N',N'-tetraglycidylmetaxylenediamine, tetraglycidyl-1,3-bisaminomethylcyclohexane, tetraglycidyl-p-phenylenediamine, tetraglycidyldiaminodiphenylmethane, diglycidylaniline, γ-caprolactone, γ-glycidoxyethyltrimethoxysilane, γ-glycidoxypropyltrimethoxysilane, γ-glycidoxypropyltriphenoxysilane, γ-glycidoxypropylmethyldimethoxysilane, γ-glycidoxypropyldiethylethoxysilane, 1,3-dimethyl-2-imidazolidinone, 1,3-diethyl-2-imidazolidinone, N,N'-dimethylpropyleneurea, and N-methyl-pyrrolidone.

In the solvent-removing step, the solvent of the polymer solution comprising the partially hydrogenated block copolymer is removed. Examples of the method for removing the solvent include, but are not limited to, a steam stripping method and a direct solvent-removing method.

The remaining amount of the solvent in the partially hydrogenated block copolymer obtained in the solvent-removing step is preferably as low as possible, for example, preferably 2% by mass or less, more preferably 0.5% by mass or less, even more preferably 0.2% by mass or less, still even more preferably 0.05% by mass or less, yet even more preferably 0.01% by mass or less, and yet still even more preferably 0% by mass. From an economic perspective, the remaining amount of the solvent in the partially hydrogenated block copolymer is usually in the range of 0.01 to 0.1% by mass.

From the perspective of resistance to thermal aging and suppressing gelation of the partially hydrogenated block copolymer, an antioxidant is preferably added to the partially hydrogenated block copolymer. Examples of the antioxidant include phenolic antioxidants such as radical scavengers, phosphorus antioxidants and sulfur antioxidants such as peroxide decomposers, and the like. Further, antioxidants combining both functions may also be used. These may be used alone or in combination of two or more. Of these, from the perspective of resistance to thermal aging and suppressing gelation of the partially hydrogenated block copolymer, a phenol antioxidant is preferred.

From the perspective of color protection and improvement in mechanical strength of the partially hydrogenated block copolymer, a decalcification step for removing metals in the solution comprising the partially hydrogenated block copolymer and a neutralization step for adjusting the pH of the solution comprising the partially hydrogenated block copolymer may be carried out by, for example, adding an acid and/or carbon dioxide gas before the solvent-removing step.

<Viscous Adhesive Composition and Partially Hydrogenated Block Copolymer Used Therein>

In the first embodiment, the partially hydrogenated block copolymer of the present embodiment can be used in a viscous adhesive composition.

Viscous adhesive compositions are used for viscous adhesive tapes, labels or to assemble nappies, for example, and are required to have a high tack strength, high tackiness, a high tack holding power, and heat discoloration resistance during production. It is noted that as a result of diligent research by the inventors, it was found that the viscous adhesive compositions described in Patent Literatures 1 to 4 do not have sufficient tack strength, tackiness, tack holding power, and heat discoloration resistance during production, and that there is a need for further improvement.

On the other hand, in the first embodiment, by using the partially hydrogenated block copolymer of the present embodiment in a viscous adhesive composition, a viscous adhesive composition having excellent tack strength, tackiness, tack holding power, and heat discoloration resistance during production can be provided.

<Partially Hydrogenated Block Copolymer>

In the first embodiment, from the perspective of the adhesive properties, tackiness, adhesion holding power, and heat discoloration resistance during production of the viscous adhesive composition, the partially hydrogenated block copolymer preferably comprises: a polymer block (A) comprising a vinyl aromatic monomer unit as a main component; and a polymer block (B1) comprising a conjugated diene monomer unit as a main component.

In the first embodiment, examples of the pre-hydrogenated structure of the partially hydrogenated block copolymer include, but are not particularly limited to, structures represented by the following formulae (7) to (12).

    (7)

    (8)

    (9)

    (10)

(11)

(12)

In the above formulae (7) to (12), A represents a polymer block comprising a vinyl aromatic monomer unit as a main component, B1 represents a polymer block comprising a conjugated diene monomer unit as a main component, X represents a residue of a coupling agent or a residue of a polymerization initiator such as a polyfunctional organolithium, and m, n, and k each represents an integer of 1 or greater and preferably an integer of 1 to 5.

In the first embodiment, when there are a plurality of polymer blocks (A) and (B1) in the block copolymer before hydrogenation, those polymer blocks may each have the same structure, such as molecular weight and composition, or have a different structure. In the above formulae (7) to (12), X represents a residue of a coupling agent or a residue of a polymerization initiator such as a polyfunctional organolithium. The partially hydrogenated block copolymer may also be a mixture of: a coupling form, in which X is a residue of a coupling agent; and a non-coupling form, in which X is absent or is a residue of a polymerization initiator. It is not necessary for the boundary or the end moiety of each block to be clearly distinguished. For example, a copolymer block of a vinyl aromatic monomer unit and a conjugated diene monomer unit may be present.

In the first embodiment, the distribution of the vinyl aromatic monomer unit in the polymer block (A) comprising a vinyl aromatic monomer unit as a main component and in the polymer block (B1) comprising a conjugated diene monomer unit as a main component is not especially limited, and may be a uniform distribution or may be a tapered, step-wise, convex or concave distribution. Further, a crystal portion may be present in the polymer block. In the polymer block (A) comprising a vinyl aromatic monomer unit as a main component, a plurality of segments each having a different vinyl aromatic monomer unit content may coexist.

In the first embodiment, from the perspective of shortening the dissolution time during production, the partially hydrogenated block copolymer preferably comprises a partially hydrogenated block copolymer (d1) comprising: one polymer block (A1) comprising a vinyl aromatic monomer unit as a main component; and one polymer block (B1) comprising a conjugated diene monomer unit as a main component. It is noted that the partially hydrogenated block copolymer (d1) refers to the structure of above formula (7) in which n=1.

In the first embodiment, from the perspective of a high tackiness of the viscous adhesive composition, the lower limit of the content of the partially hydrogenated block copolymer (d1) is, based on 100% by mass of the partially hydrogenated block copolymer, preferably 20% by mass or more, more preferably 30% by mass or more, even more preferably 50% by mass or more, still even more preferably 65% by mass or more, and yet still even more preferably 70% by mass or more. Further, from the perspective of the tack strength of the viscous adhesive composition, the upper limit of the content of the partially hydrogenated block copolymer (d1) is, based on 100% by mass of the partially hydrogenated block copolymer, preferably 95% by mass or less, more preferably 90% by mass or less, even more preferably 85% by mass or less, still even more preferably 83% by mass or less, and yet still even more preferably 80% by mass or less.

From the perspective of a low viscosity and a high tack holding power of the viscous adhesive composition, the partially hydrogenated block copolymer of the first embodiment preferably comprises a partially hydrogenated block copolymer (r1) having a radial structure. Here, in the present specification, "radial structure" refers to a structure in which three or more polymers are bound to a residue X. For example, examples of such a structure include A-(B1-A)$_n$-X (n≥3), [(A-B1)$_k$]$_m$-X (m≥3), and [(A-B1)$_k$-A]$_m$-X (m≥3).

In the first embodiment, from the perspective of a high tack strength, a low viscosity, and a high tack holding power of the viscous adhesive composition, the partially hydrogenated block copolymer (r1) having a radial structure is preferably at least one structure selected from the group consisting of [(A-B1)$_k$]$_m$-X and [(A-B1)$_k$-A]$_m$-X (wherein m denotes an integer of 3 to 6 and k denotes an integer of 1 to 4; and more preferably m denotes an integer of 3 or 4).

In the first embodiment, the degree of hydrogenation of the partially hydrogenated block copolymer is, based on the total number of moles of the conjugated diene monomer unit, preferably 10 to 95 mol %, more preferably 20 to 74 mol %, even more preferably 31 to 70 mol %, still even more preferably 33 to 63 mol %, and yet still even more preferably 35 to 59 mol %.

The degree of hydrogenation of the partially hydrogenated block copolymer can be adjusted by controlling the hydrogenation amount and the hydrogenation reaction time in the hydrogenation step, which is described later. Further, the degree of hydrogenation can be calculated by using the method described in the Examples, which are described below.

The content (TS) of the vinyl aromatic monomer unit in the partially hydrogenated block copolymer of the first embodiment is, from the perspective of the tack strength, tackiness, and a high tack holding power of the viscous adhesive composition, and a high heat discoloration resistance during production of the viscous adhesive composition, preferably 10 to 45% by mass, more preferably 13 to 40% by mass, and even more preferably 15 to 35% by mass.

The content (BS) of the polymer block (A) comprising a vinyl aromatic monomer unit as a main component in the partially hydrogenated block copolymer of the first embodiment is, from the perspective of a high tack holding power of the viscous adhesive composition, preferably 12 to 43% by mass, more preferably 13 to 40% by mass, and even more preferably 14 to 34% by mass.

It is noted that the content (TS) of the vinyl aromatic monomer unit, and the content (BS) of the polymer block (A) comprising a vinyl aromatic monomer unit as a main component, in the partially hydrogenated block copolymer can be measured by using the method described in the Examples, which are described later.

The molecular weight distribution of the polymer block (A) comprising a vinyl aromatic monomer unit as a main component is, from the perspective of the tack holding power of the viscous adhesive composition, preferably 1.46 or less, more preferably 1.44 or less, even more preferably 1.42 or less, and still even more preferably 1.40 or less. Further, from the perspective of the tack strength, the tackiness, the tack holding power, and the heat discoloration resistance during production of the viscous adhesive composition, the molecular weight distribution of the polymer block (A) comprising a vinyl aromatic monomer unit as a main component is preferably 1.1 or more, more preferably 1.12 or more, even more preferably 1.14 or more, and still even more preferably 1.16 or more. The molecular weight distribution of the polymer block (A) comprising a vinyl aromatic monomer unit as a main component can be calculated by using the following formula. Molecular weight distribution=(molecular weight of high molecular weight side at full width at half maximum of peak molecular weight of polymer block (A))/(molecular weight of low molecular weight side at full width at half maximum of peak molecular weight of polymer block (A))

The average vinyl content in the pre-hydrogenated conjugated diene monomer unit of the partially hydrogenated block copolymer of the first embodiment is preferably 15 to 75 mol %, more preferably 25 to 55 mol %, and even more preferably 35 to 45 mol %. By setting the average vinyl content in the pre-hydrogenated conjugated diene monomer unit of the partially hydrogenated block copolymer of the first embodiment to 15 mol % or more, the tackiness, the tack strength, and the tack holding power of the viscous adhesive composition tend to improve. Further, by setting the vinyl content in the pre-hydrogenated conjugated diene monomer unit of the partially hydrogenated block copolymer of the first embodiment to 75 mol % or less, the tackiness and the heat discoloration resistance of the viscous adhesive composition tend to improve. "Vinyl content" as used in the present specification refers to the percentage of pre-hydrogenated conjugated diene monomer units incorporated by 1,2 bonds and 3,4-bonds, based on the total amount of moles of the pre-hydrogenated conjugated diene monomer unit incorporated by 1,2-bonds, 3,4-bonds, and 1,4-bonds. It is noted that the vinyl content can be measured by NMR, and specifically, can be measured by using the method described in the Examples, which are described below. The distribution of the vinyl content in the block comprising a conjugated diene monomer unit as a main component is not particularly limited.

In the first embodiment, the copolymer block (B1) comprising a conjugated diene monomer unit as a main component may have a vinyl content distribution. The lower limit of the difference (hereinafter also referred to as "the vinyl content Δ") in the level of the vinyl content of the copolymer block (B) comprising a conjugated diene monomer unit as a main component of the partially hydrogenated block copolymer is, from the perspective of a high tackiness of the viscous adhesive composition, preferably 5 mol % or more, more preferably 8 mol % or more, even more preferably 15 mol % or more, and still even more preferably 20 mol % or more. Further, from the perspective of a high tackiness of the viscous adhesive composition, the upper limit of the vinyl content Δ is preferably 30 mol % or less, more preferably 25 mol % or less, even more preferably 20 mol % or less, and still even more preferably 17 mol % or less.

In the copolymer block (B) comprising a conjugated diene monomer unit and a vinyl aromatic monomer unit, when $V_1$ to $V_6$ respectively represent a vinyl content before hydrogenation of a first region to a sixth region each representing an equal mass in order from a polymerization start side, the distribution of the vinyl content is not particularly limited, and may be a uniform distribution, a tapered distribution, a convex distribution, or a concave distribution. The vinyl distribution can be set to a tapered shape, a convex shape, or a concave shape by adding a polar compound during polymerization or by controlling the temperature of polymerization.

A tapered distribution is a distribution that satisfies $V_6 > V_5 > V_4 > V_3 > V_2 > V_1$, or $V_6 < V_5 < V_4 < V_3 < V_2 < V_1$. A convex distribution is a distribution in which $V_6$ and $V_1$ are smaller than $V_5$ and $V_2$, and $V_5$ and $V_2$ are smaller than $V_4$ and $V_3$. A concave distribution is a distribution in which $V_6$ and $V_1$ are larger than $V_5$ and $V_2$, and $V_5$ and $V_2$ are larger than $V_4$ and $V_3$.

In the first embodiment, the weight average molecular weight (Mw) of the partially hydrogenated block copolymer is, from the perspective of a high tack strength and tack holding power, preferably 100,000 or more, more preferably 180,000 or more, and even more preferably 200,000 or more. Further, from the perspective of high producibility, the weight average molecular weight (Mw) of the partially hydrogenated block copolymer is preferably 350,000 or less, more preferably 300,000 or less, and even more preferably 250,000 or less.

In the first embodiment, the lower limit of the molecular weight distribution (Mw/Mn) (ratio of weight average molecular weight (Mw) to number average molecular weight (Mn)) of the partially hydrogenated block copolymer is, from the perspective of high producibility, preferably 1.1 or more, more preferably 1.2 or more, even more preferably 1.3 or more, and still even more preferably 1.4 or more. Further, from the perspective of a high tack strength and tack holding power, the upper limit of the molecular weight distribution (Mw/Mn) of the partially hydrogenated block copolymer is preferably 3.0 or less, more preferably 2.0 or less, and even more preferably 1.7 or less. The weight average molecular weight (Mw) and number average molecular weight (Mn) of the polymer, and the molecular weight distribution (Mw/Mn) can be calculated by using the method described in the Examples, which are described below.

In the first embodiment, from the perspective of a high tack strength, a high tackiness, and a high tack holding power of the viscous adhesive composition, the partially hydrogenated block copolymer preferably comprises at least one functional group selected from the group consisting of a hydroxyl group, an acid anhydride group, an epoxy group, an amino group, an amide group, a silanol group, and an alkoxysilane group. Of these, the partially hydrogenated block copolymer more preferably comprises at least one functional group selected from the group consisting of an amino group and an amide group, and even more preferably comprises an amino group. The partially hydrogenated block copolymer more preferably comprises, based on 1 mole of the molecule, 2 moles or more of at least one functional group selected from the group consisting of an amino group and an amide group.

The partially hydrogenated block copolymer of the first embodiment preferably has a melt flow rate (MFR, 200° C., 5 kgf) of 0.1 to 50 g/10 minutes, more preferably 0.2 to 20 g/10 minutes, even more preferably 0.3 to 10 g/10 minutes, and still even more preferably 0.4 to 5 g/10 minutes. In the first embodiment, if the MFR of the partially hydrogenated block copolymer is 0.1 g/10 minutes or more, resistance against bleeding from the edges of a tape on which the viscous adhesive composition is laminated tends to improve. Further, in the first embodiment, if the MFR of the partially hydrogenated block copolymer is 50 g/10 minutes or less, the coating properties and heat discoloration resistance of the viscous adhesive composition tend to improve.

<Method of Producing Partially Hydrogenated Block Copolymer>

The partially hydrogenated block copolymer of the first embodiment can be produced by, for example, performing a polymerization step for obtaining a block copolymer comprising: a polymer block (A) comprising a vinyl aromatic monomer unit as a main component; and a polymer block (B1) comprising a conjugated diene monomer unit as a main component; by polymerizing at least a conjugated diene monomer and a vinyl aromatic monomer in a hydrocarbon solvent using a lithium compound as a polymerization initiator, performing after the polymerization step a hydrogenation step for hydrogenating a part of the double bonds in the conjugated diene monomer unit of the obtained block copolymer, and then performing a solvent-removing step for removing the solvent of the solution comprising the obtained partially hydrogenated block copolymer.

The polymerization step, the hydrogenation step, the solvent-removing step, and the like are the same as those described above, and hence a description thereof is omitted here.

<Viscous Adhesive Composition>

The viscous adhesive composition of the first embodiment preferably comprises 20 to 400 parts by mass of a tackifier resin based on 100 parts by mass of the above partially hydrogenated block copolymer, more preferably 30 to 350 parts by mass, and even more preferably 40 to 300 parts by mass.

In the first embodiment, the "tackifier resin " is not particularly limited, as long as it is capable of imparting tackiness to the viscous adhesive composition. This tackifier resin is preferably a resin (oligomer) having a number average molecular weight of 100 to 10,000. The number average molecular weight of the tackifier resin can be measured by using the same method of measuring the number average molecular weight as described in the Examples, which are described below.

Examples of the tackifier resin include, but are not particularly limited to, a rosin derivative (including tung oil resin), tall oil, derivatives of tall oil, rosin ester resins, natural and synthetic terpene resins, aliphatic hydrocarbon resins, aromatic hydrocarbon resins, mixed aliphatic-aromatic hydrocarbon resins, coumarin-indene resins, phenol resins, p-tert-butylphenol-acetylene resins, phenol-formaldehyde resins, xylene-formaldehyde resins, oligomers of monoolefins, oligomers of diolefins, aromatic hydrocarbon resins, hydrogenated aromatic hydrocarbon resins, cyclic aliphatic hydrocarbon resins, hydrogenated hydrocarbon resins, hydrocarbon resins, hydrogenated tung oil resins, hydrogenated oil resins, and esters of a hydrogenated oil resin and a monofunctional or multi-functional alcohol. These may be used alone or in combination of two or more. In the case of hydrogenating, all of the unsaturated groups may be hydrogenated, or a part of the unsaturated groups may be left.

From the perspective of adhesion strength, tack holding power, and high resistance against bleeding from the edges when laminating the tape, the tackifier resin preferably comprises a tackifier resin having a softening point of 80° C. or more. The lower limit of the softening point of the tackifier resin is more preferably 85° C. or more, even more preferably 95° C. or more, and still even more preferably 100° C. or more. The upper limit of the softening point of the tackifier resin is not particularly limited, but is preferably 145° C. or less. The softening point of the tackifier resin can be measured in accordance with the JISK2207 ring and ball method.

In the first embodiment, from the perspective of the high adhesive properties, decrease of change in the adhesion strength over time, creep performance and the like of the viscous adhesive composition, the viscous adhesive composition preferably further comprises 20 to 75% by mass of a tackifier having affinity for a non-glass phase block (usually, a middle block) of the partially hydrogenated block copolymer and 3 to 30% by mass of a tackifier having affinity for a glass phase block (usually, outer block) of the partially hydrogenated block copolymer.

The tackifier having affinity for a glass phase block of the partially hydrogenated block copolymer is not particularly limited, but is preferably, for example, a tackifier resin having an end block. Examples of such a tackifier include, but are not particularly limited to, resins having an aromatic group, such as a homopolymer or a copolymer comprising vinyltoluene, styrene, α-methylstyrene, coumarone, indene, or the like. Of these, Kristalex and Plastolyn (trade names, manufactured by Eastman Chemical Company) comprising α-methylstyrene are preferable. The content of the tackifier having affinity for a glass phase block of the partially hydrogenated block copolymer is preferably 3 to 30% by mass, more preferably 5 to 20% by mass, and even more preferably 6 to 12% by mass, based on the total amount of the viscous adhesive composition.

In the first embodiment, from the perspective of a high initial adhesion strength, a high wettability, a low melt viscosity, and high coating properties of the viscous adhesive composition, the tackifier is preferably a petroleum resin having an aroma content of 3 to 12% by mass, and more preferably is a petroleum resin having an aroma content of 3 to 12% by mass and that has been hydrogenated. The aroma content in the tackifier is preferably 3 to 12% by mass and more preferably 4 to 10% by mass. In the present specification, "aroma" refers to a non-hydrogenated aromatic component.

In the first embodiment, from the perspective of a higher weather resistance (smaller change in tack strength after UV irradiation) and less odor of the viscous adhesive composition, the tackifier is preferably a hydrogenated tackifier resin. A "hydrogenated tackifier resin" refers to a tackifier resin obtained by hydrogenating an aliphatic tackifier resin containing unsaturated bonds or an aromatic tackifier resin containing unsaturated bonds such that the tackifier resin has an arbitrary degree of hydrogenation. The hydrogenated tackifier resin preferably has a higher degree of hydrogenation.

Examples of the hydrogenated tackifier resin include Arkon M and Askon P (trade names, manufactured by ARAKAWA CHEMICAL INDUSTRIES, Ltd.), Kuriaron P (trade name, manufactured by YASUHARA CHEMICAL CO., LTD.), Aimabu P(trade name, manufactured by Idemitsu Kosan Co., Ltd.), and the like.

The content of the tackifier in the viscous adhesive composition of the first embodiment may be 20 parts by mass or more and 400 parts by mass or less based on 100 parts by mass of the partially hydrogenated block copolymer, preferably 70 parts by mass or more and 350 parts by mass or less, more preferably 120 parts by mass or more and 300 parts by mass or less, and even more preferably 140 parts by mass or more and 250 parts by mass or less. If the content of the tackifier is in the above range, the balance between tackiness and tack holding power tends to improve.

In the first embodiment, in addition to the partially hydrogenated block copolymer and the tackifier, the viscous adhesive composition may optionally include various additives, such as oil, an antioxidant, an anti-weathering agent, an antistatic agent, a lubricant, a filler, a wax, and the like, as necessary.

Examples of the oil include, but are not particularly limited to, a paraffinic oil comprising a paraffinic hydrocarbon as a main component, a naphthenic oil comprising a naphthenic hydrocarbon as a main component, and an aromatic oil comprising an aromatic hydrocarbon as a main component. Of these, a colorless and substantially odorless oil is preferable. The oil may be used alone or in combination of two or more.

Examples of paraffinic oils include, but are not particularly limited to, Diana Process Oil PW-32, PW-90, PW-150, and PS-430 (manufactured by Idemitsu Kosan Co., Ltd.), Shintakku PA-95, PA-100, PA-140 (manufactured by KOBE OIL CHEMICAL INDUSTRIAL Co., Ltd.), JOMO Process P200, P300, P500, and 750 (manufactured by Japan Energy Corporation), Sunpar 110, 115, 120, 130, 150, 2100, and 2280 (manufactured by JAPAN SUN OIL COMPANY, LTD), and Fukkol process P-100, P-200, P-300, P-400, and P-500 (manufactured by FUJI KOSAN CO., LTD).

Examples of naphthenic oils include, but are not particularly limited to, Diana Process Oil NP-24, NR-26, NR-68, NS-905, NS-100, and NM-280 (manufactured by Idemitsu Kosan Co., Ltd.), Syntack N-40, N-60, N-70, N-75, and N-80 (manufactured by KOBE OIL CHEMICAL INDUSTRIAL Co., Ltd.), Shell Flex 371JY (manufactured by Shell Japan), JOMO Process R25, R50, R200, and R1000 (manufactured by Japan Energy Corporation), Sunthene oil 310, 410, 415, 420, 430, 450, 380, 480, 3125, 4130, and 4240 (manufactured by JAPAN SUN OIL COMPANY, LTD), Fukkol New FLEX 1060W, 1060E, 1150W, 1150E, 1400W, 1400E, 2040E, and 2050N (manufactured by FUJI KOSAN CO., LTD), and Petlex process oil PN-3, PN-3M, and PN-3N-H (manufactured by YAMABUN YUKA Co., Ltd).

Examples of aromatic oils include, but are not particularly limited to, Diana Process Oil AC-12, AC-640, AH-16, AH-24, and AH-58 (manufactured by Idemitsu Kosan Co., Ltd.), Syntack HA-10, HA-15, HA-30, and HA-35 (manufactured by KOBE OIL CHEMICAL INDUSTRIAL Co., Ltd.), COSMO Process 40, 40A, 40C, 200A, 100, and 1000 (manufactured by COSMO OIL LUBRICANTS Co., Ltd.), JOMO Process X50, X100E, and X140 (manufactured by Japan Energy Corporation), JSO Aroma 790 and Nitoplane 720L (manufactured by JAPAN SUN OIL COMPANY, LTD), Fukkol Aromax 1, $^3$, $^5$, and EXP1 (manufactured by FUJI KOSAN CO., LTD), and Petlex process oil LPO-R, LPO-V, and PF-2 (manufactured by YAMABUN YUKA Co., Ltd). When it is necessary for the viscous adhesive composition to have higher weather resistance, it is preferable to use a paraffinic oil.

In the first embodiment, from the perspective of a balance among a high tack holding power, tack strength, and resistance to adhesive deposition of the viscous adhesive composition, the oil content is preferably 10 to 150 parts by mass based on 100 parts by mass of the partially hydrogenated block copolymer, more preferably 30 to 130 parts by mass, and even more preferably 50 to 100 parts by mass.

Examples of the antioxidant include, but are not particularly limited to, phenolic antioxidants, sulfur antioxidants, and phosphorous antioxidants.

From the perspective of high weather resistance (smaller change in tack strength after UV irradiation) of the viscous adhesive composition, it is preferable to add an anti-weathering agent.

Examples of the anti-weathering agent include inorganic ultraviolet absorbers, such as benzotriazole-based ultraviolet absorbers, triazine-based ultraviolet absorbers, benzophenone-based ultraviolet absorbers, benzoate-based ultraviolet absorbers, hindered amine-based light stabilizers, and fine particulate cerium oxide. From the perspective of even higher weather resistance of the viscous adhesive composition, benzotriazole-based ultraviolet absorbers and hindered amine-based light stabilizers are preferable, and it is even more preferable to use a benzotriazole-based ultraviolet absorber and a hindered amine-based light stabilizer together.

In the first embodiment, the lower limit of the content of the anti-weathering agent in the viscous adhesive composition is, from the perspective of a high weather resistance of the viscous adhesive composition, preferably 0.03% by mass or more, more preferably 0.05% by mass or more, and even more preferably 0.07% by mass or more. The upper limit of the content of the anti-weathering agent in the viscous adhesive composition of the first embodiment is, from the perspective of suppressing bleeding of the anti-weathering agent and economic efficiency, preferably 1% by mass or less, more preferably 0.5% by mass or less, and even more preferably 0.3% by mass or less of the viscous adhesive composition.

From the perspective of an even higher weather resistance of the viscous adhesive composition, it is preferable to further use the above anti-weathering agent together with the above antioxidant. When using the anti-weathering agent and the antioxidant together, among antioxidants, from the perspective of even higher weather resistance, it is preferable to use at least a phosphorus antioxidant in addition to the above anti-weathering agent.

The lower limit of the content of the antioxidant in the viscous adhesive composition of the first embodiment is, from the perspective of a high weather resistance, preferably 0.02% by mass or more, more preferably 0.04% by mass or more, and even more preferably 0.06% by mass or more. The upper limit of the content of the antioxidant in the viscous adhesive composition of the first embodiment is, from the perspective of suppressing bleeding of the antioxidant and economic efficiency, preferably 1.5% by mass or less, and more preferably 1.0% by mass or less.

In the first embodiment, from the perspective of preventing the occurrence of static electricity by the tackifier resin, the viscous adhesive composition of the present embodiment preferably comprises an antistatic agent.

Examples of the antistatic agent include surfactants, conductive resins, conductive fillers, and the like.

In the first embodiment, in order to improve the lubricating properties of the product surface during and after plastic molding, the viscous adhesive composition may comprise a lubricant.

Examples of the lubricant include stearic acid amide, calcium stearate, and the like.

In the first embodiment, the viscous adhesive composition may comprise a filler. Examples of the filler include, but are not particularly limited to, mica, calcium carbonate, kaolin, talc, diatomaceous earth, a urea resin, styrene beads, calcined clay, and starch. The shape of these fillers is preferably spherical.

In the first embodiment, the viscous adhesive composition may comprise a wax. Examples of the wax include, but are not particularly limited to, paraffin wax, microcrystalline wax, and a low molecular-weight polyethylene wax.

In the first embodiment, when the viscous adhesive composition is required to have a low melt viscosity at 130° C. or less, the viscous adhesive composition preferably comprises 2 to 10% by mass of at least one type of wax having a melting point of 50 to 110° C., for example, a wax selected from the group consisting of paraffin wax, microcrystalline wax and Fischer-Tropsch wax. The content of each of these waxes having a melting point of 50 to 110° C. is preferably 5 to 10% by mass based on the total amount of the viscous adhesive composition. Further, the melting point of these waxes is preferably 65° C. or more, more preferably 70° C. or more, and even more preferably 75° C. or more. In addition, the softening point of the tackifier used in combination in this case is preferably 70° C. or more and more preferably 80° C. or more. At this time, a storage elastic modulus G' (measurement conditions: 25° C., 10 rad/s) of the viscous adhesive composition to be obtained is preferably 1 Mpa or less, and further a crystallization temperature thereof is preferably 7° C. or less.

In the first embodiment, the viscous adhesive composition may comprise a polymer other than the partially hydrogenated block copolymer of the present embodiment (hereinafter sometimes referred to simply as "other polymer"). Examples of the other polymer include, but are not particularly limited to, olefin elastomers such as a natural rubber, a polyisoprene rubber, a polybutadiene rubber, a styrene-butadiene copolymer, and an ethylene-propylene copolymer; a chloroprene rubber, an acrylic rubber, and an ethylene-vinyl acetate copolymer. These may be a liquid or a solid at room temperature.

In the first embodiment, from the perspective of a balance among a high tack strength, high tackiness, and a high tack holding power of the viscous adhesive composition, the content of the other polymer is preferably 80 parts by mass or less based on 100 parts by mass of the partially hydrogenated block copolymer of the present embodiment, more preferably 60 parts by mass or less, even more preferably 40 parts by mass or less, still even more preferably 20 parts by mass or less, and yet still even more preferably 10 parts by mass or less.

The other polymer may be a block copolymer other than the partially hydrogenated block copolymer of the present embodiment (hereinafter also referred to simply as "other block copolymer"). Examples of the other block copolymer include, but are not particularly limited to, a styrene-butadiene block copolymer, a styrene-isoprene block copolymer, a hydrogenated styrene-butadiene block copolymer (SEBS), and a hydrogenated styrene-isoprene block copolymer (SEPS). The other block copolymer may be a block copolymer having two or more kinds of different vinyl aromatic monomer units content, a non-hydrogenated block copolymer comprising a vinyl aromatic monomer unit as a main component, or a completely hydrogenated block copolymer.

In the first embodiment, from the perspective of a balance between a high tackiness and a high tack strength of the viscous adhesive composition, the other block copolymer is preferably a block copolymer comprising: one polymer block comprising a vinyl aromatic monomer unit as a main component; and one copolymer block comprising a conjugated diene monomer unit as a main component.

In the first embodiment, from the perspective of a balance between a high holding power and a low melt viscosity of the viscous adhesive composition, the other block copolymer preferably has a radial structure.

In the first embodiment, the degree of hydrogenation of the other block copolymer is not particularly limited.

In the first embodiment, when the viscous adhesive composition comprises a completely hydrogenated block copolymer as the other polymer, from the perspective of the softness of the viscous adhesive composition, the average vinyl content in the pre-hydrogenated conjugated diene monomer unit in the other polymer is preferably 35 to 80 mol %, more preferably 40 to 75 mol %, and even more preferably 50 to 75 mol %.

In the first embodiment, the viscous adhesive composition may comprise, as the other polymer, a polymer comprising as a main component a vinyl aromatic monomer unit having a weight average molecular weight (Mw) of 5,000 to 30,000 (hereinafter also referred to as "low molecular weight vinyl aromatic polymer"). The low molecular weight vinyl aromatic polymer preferably comprises the vinyl aromatic monomer unit comprised in the polymer block (A) of the present embodiment as a main component, and more preferably comprises a monomer unit derived from polystyrene as a main component.

In the first embodiment, from the perspective of the solubility of the viscous adhesive composition, the lower limit of the content of the low molecular weight vinyl aromatic polymer in the viscous adhesive composition is preferably 0.5 parts by mass or more based on 100 parts by mass of the partially hydrogenated block copolymer of the present embodiment, more preferably 1.0 part by mass or more, even more preferably 2.0 parts by mass or more, and still even more preferably 3.0 parts by mass or more. Further, from the perspective of the adhesive properties, tackiness, adhesion holding power, and the like of the viscous adhesive composition, the upper limit of the content of the low molecular weight vinyl aromatic polymer is preferably 5.0 parts by mass or less based on 100 parts by mass of the partially hydrogenated block copolymer of the present embodiment, more preferably 4.0 parts by mass or less, even more preferably 3.0 parts by mass or less, and still even more preferably 2.0 parts by mass or less.

In the first embodiment, the low molecular weight vinyl aromatic polymer is preferably mixed in advance with the partially hydrogenated block polymer of the present embodiment, and then mixed with the tackifier resin. The low molecular weight vinyl aromatic polymer may be prepared separately and then mixed with the partially hydrogenated block copolymer of the present embodiment, or may be prepared at the same time as the partially hydrogenated block copolymer of the present embodiment.

As a method of preparing the low molecular weight vinyl aromatic polymer at the same time as the partially hydrogenated block copolymer of the present embodiment, for example, when producing a living block copolymer comprising: a polymer block (A) comprising a vinyl aromatic monomer unit as a main component; and a polymer block (B) comprising a conjugated diene monomer unit, a block copolymer comprising: a polymer block (A) comprising a vinyl aromatic monomer unit as a main component; and a polymer block (B) comprising a conjugated diene monomer unit, and the low molecular weight vinyl aromatic polymer can be prepared at the same time by causing a portion of the vinyl aromatic monomer to be used to remain as a living polymer comprising as a main component a vinyl aromatic monomer unit having a weight average molecular weight (Mw) of 5,000 to 30,000, and then inactivating the living block copolymer and the remaining living polymer.

Examples of methods of causing a portion of the vinyl aromatic monomer to remain as a living polymer comprising as a main component a vinyl aromatic monomer unit having a weight average molecular weight (Mw) of 5,000 to 30,000, include controlling the amount of the monomer and the amount of the polymerization initiator to be added in the polymerization step, the reaction temperature, the reaction time, and the like. From the perspective of controlling the molecular weight and the content of the low molecular weight vinyl aromatic polymer, the reaction temperature starting the polymerization of the polymer block (A) is preferably 55° C. or more and 65° C. or less. The reaction time for the polymerization of the polymer block (A) is preferably 2 minutes or more and 5 minutes 30 seconds or less from the point at which the temperature has increased due to the polymerization reaction and indicates a maximum value.

The low molecular weight vinyl aromatic polymer can also be prepared at the same time as the partially hydrogenated block copolymer of the present embodiment by, for example, when preparing the polymer block (A) comprising a vinyl aromatic monomer unit as a main component by polymerizing the vinyl aromatic monomer unit, adding an active hydrogen compound, such as methanol to inactivate a portion of the living polymer block (A). The partially hydrogenated block copolymer of the present embodiment can then be prepared by polymerizing a polymer block (B) comprising a conjugated diene monomer unit with the remaining living polymer block (A) that has not been inactivated. Therefore, the low molecular weight vinyl aromatic polymer can be prepared at the same time as the partially hydrogenated block copolymer of the present embodiment.

The low molecular weight vinyl aromatic polymer prepared in this manner at the same time as the partially hydrogenated block copolymer of the present embodiment is detected as a low molecular weight component when measuring the weight average molecular weight (Mw) of the partially hydrogenated block copolymer of the present embodiment. Therefore, during measurement, the presence of the low molecular weight vinyl aromatic polymer can be confirmed. Further, the weight average molecular weight (Mw) and the molecular weight distribution (Mw/Mn) can also be measured.

In the first embodiment, a commercially-available low molecular weight vinyl aromatic polymer may be mixed with the partially hydrogenated block copolymer of the present embodiment.

In the first embodiment, if high low-temperature coating properties (low viscosity), creep performance (the smaller the value, the better), high strength, high ductility, and the like are required, as the other polymer, an ionomer may be used in the viscous adhesive composition within the range of 5% by mass or less.

In the first embodiment, in order to exhibit excellent adhesion strength to a moist, hydrophilic porous substrate, it is preferable to add, as the other polymer, a liquid rubber having a carboxyl group and/or carboxylic acid anhydride group in the molecule and/or an acid-modified polyethylene that has been acid-modified with carboxylic acid anhydride, in the range of 0.5 to 8% by mass, to the viscous adhesive composition.

In one embodiment, in order to obtain high-temperature storage stability, high ductility, or reduce the amount of tackifier resin in the composition, it is preferable that the viscous adhesive composition comprises, as the other polymer, a copolymer using α-olefin, or a propylene homopolymer, in the range of 20% by mass or less. The melting points (conditions: DSC measurement, 5° C/minute) of these polymers are preferably 110° C. or less, more preferably 100° C. or less, and even more preferably 60 to 90° C. These polymers may be resins or elastomers.

In the first embodiment, from the perspective of the ductility and the like of the viscous adhesive composition, the viscous adhesive composition preferably comprises an olefinic elastomer as the other polymer. The olefinic elastomer is preferably, although not particularly limited to, an olefinic elastomer having a Tg of at least −10° C. or less. Further, from the perspective of creep performance, an olefinic elastomer having a block is more preferable.

In the first embodiment, when the viscous adhesive composition is used under a high-temperature environment, it is preferable to improve heat resistance by using in the viscous adhesive composition an additive capable of radical cross-linking, epoxy cross-linking, or urethane cross-linking, as described in Japanese Patent Laid-Open No. 2015-28130, Japanese Patent Laid-Open No. 2007-56119, Japanese Patent Laid-Open No. 2014-534303, or Japanese Patent Laid-Open No. 2015-30854.

In the first embodiment, the viscous adhesive composition can be used in viscous adhesive tape and labels, although it is not limited to such uses.

<Viscous Adhesive Tape and Label>

In the first embodiment, the viscous adhesive tape comprises the viscous adhesive composition described above. In the first embodiment, the label comprises the viscous adhesive composition described above.

In the first embodiment, the viscous adhesive composition is preferably used by being laminated on any substrate. Examples of the substrates include, but are not particularly limited to, a film made of a thermoplastic resin and a substrate made of a non-thermoplastic resin, such as paper, metal, woven fabric, and nonwoven fabric. A release agent may also be added to the material of the substrate. Examples of the release agent include long-chain alkyl-based release agents, silicon-based release agents, and the like. Further, if better weather resistance (smaller change in the tack strength after UV irradiation) is required, it is preferable to use a substrate having a low UV transmittance. The UV transmittance is more preferably 1% or less.

<Method of Producing Viscous Adhesive Composition>

In the first embodiment, the viscous adhesive composition can be produced by, for example, mixing 20 to 400 parts by mass of the tackifier resin based on 100 parts by mass of the partially hydrogenated block copolymer of the present embodiment. The mixing method is not particularly limited. An example of the mixing method is to uniformly mix each of the components, such as the partially hydrogenated block copolymer, the tackifier resin, and the optional other block copolymer, and oil, at a predetermined mixing ratio by a known mixer, such as a kneader, a single-screw extruder, a twin-screw extruder, or a Banbury mixer, while heating.

<Method of Producing Viscous Adhesive Tape and Label>

In the first embodiment, the viscous adhesive tape and the label can be produced by coating the viscous adhesive composition on any substrate. Examples of the method for coating the viscous adhesive composition on a substrate include, but are not particularly limited to, T-die coating, roll coating, multibead coating, and spray coating. Further, the viscous adhesive composition of the first embodiment may be coated by extrusion coating (hot melt coating) or by solution coating, but from the perspective of a high resistance to thermal aging and economic efficiency, extrusion coating is preferable.

In the first embodiment, the viscous adhesive composition can be suitably used in various types of viscous adhesive tapes, labels, pressure-sensitive thin boards, pressure-sensitive sheets, surface protecting sheets and films, backing adhesives for fixing light-weight plastic molded articles, backing adhesives for fixing carpet, backing adhesives for fixing tiles, adhesives, sealing agents, masking agent used during repainting paint, sanitary goods, and the like. In particular, the viscous adhesive composition is preferable for a viscous adhesive tape.

<Modified Asphalt Composition and Paving Binder Composition, and Partially Hydrogenated Block Copolymer Used Therein>

In the second embodiment, the partially hydrogenated block copolymer of the present embodiment can be used in a modified asphalt composition. Further, in the third embodiment, the partially hydrogenated block copolymer of the present embodiment can be used in a paving binder composition.

As a result of diligent research by the inventors, it was found that modified asphalt compositions using the block copolymers disclosed in Patent Literatures 5 to 7 cannot obtain sufficient heat resistance stability during storage, low-temperature ductility, and resistance to aggregate stripping of the modified asphalt composition, and that there is a need for further improvement. Further, the inventors also found that the paving binder composition described in Patent Literature 8 cannot obtain sufficient softening point, low-temperature ductility, melt viscosity, rutting resistance, heat resistance stability, and heat discoloration resistance, and that there is a need for further improvement.

On the other hand, by using the partially hydrogenated block copolymer of the present embodiment in a modified asphalt composition, a modified asphalt composition can be provided that has excellent softening point, low-temperature ductility, melt viscosity, rutting resistance, and heat resistance stability during storage. Further, by using the partially hydrogenated block copolymer of the present embodiment in a paving binder composition, a paving binder composition can be provided that has excellent softening point, low-temperature ductility, melt viscosity, rutting resistance, heat resistance stability, and heat discoloration resistance.

<Partially Hydrogenated Block Copolymer>

In the second and third embodiments, the partially hydrogenated block copolymer preferably comprises a partially hydrogenated block copolymer (d2) comprising: a polymer block (A) comprising a vinyl aromatic monomer unit as a main component; and a copolymer block (B2) comprising a vinyl aromatic monomer unit and a conjugated diene monomer unit. As a result of the block copolymer having this structure, the modified asphalt composition has preferable resistance to thermal aging during storage, fluidity resistance, resistance to aggregate stripping, and high compatibility with the asphalt. Further, the paving binder composition has preferable softening point, low-temperature ductility, melt viscosity, rutting resistance, heat resistance stability, and heat discoloration resistance.

In the second and third embodiments, examples of the pre-hydrogenated structure of the partially hydrogenated block copolymer include, but are not particularly limited to, structures represented by the following formulae (13) to (18).

(A-B2)$_n$ (13)

B2-(A-B2)$_n$ (14)

A-(B2-A)$_n$ (15)

A-(B2-A)$_n$-X (16)

[(A-B2)$_k$]$_m$-X (17)

[(A-B2)$_k$-A]$_m$-X (18)

In the above formulae (13) to (18), A represents a polymer block comprising a vinyl aromatic monomer unit as a main component, B2 represents a copolymer block comprising a vinyl aromatic monomer unit and a conjugated diene monomer unit, X represents a residue of a coupling agent or a residue of a polymerization initiator such as a polyfunctional organolithium, and m, n, and k each denote an integer of 1 or greater and preferably an integer of 1 to 5.

In the second and third embodiments, when there are a plurality of polymer blocks (A) and (B2) in the block copolymer before hydrogenation, those polymer blocks may each have the same structure, such as molecular weight and composition, or have a different structure. In the above formulae (13) to (18), X represents a residue of a coupling agent or a residue of a polymerization initiator such as a polyfunctional organolithium. The partially hydrogenated block copolymer may also be a mixture of: a coupling form, in which X is a residue of a coupling agent; and a non-coupling form, in which X is absent or is a residue of a polymerization initiator. It is not necessary for the boundary or the end moiety of each block to be clearly distinguished.

In the second and third embodiments, the distribution of the vinyl aromatic monomer unit in the polymer block (A) comprising a vinyl aromatic monomer unit as a main component and the copolymer block (B2) comprising a conjugated diene monomer unit and a vinyl aromatic monomer unit is not especially limited, and may be a uniform distribution or may be a tapered, step-wise, convex, or concave distribution. Further, a crystal portion may be present in the polymer block. In the polymer block (A) comprising a vinyl aromatic monomer unit as a main component, a plurality of segments each having a different vinyl aromatic monomer unit content may coexist.

In the second and third embodiments, from the perspective of a low viscosity of the modified asphalt composition, and the perspective of a low melt viscosity of the paving binder composition, the partially hydrogenated block copolymer preferably comprises a partially hydrogenated block copolymer (d2) comprising: one polymer block (A1) comprising a vinyl aromatic monomer unit as a main component; and one hydrogenated copolymer block (B2) comprising a vinyl aromatic monomer unit and a conjugated diene monomer unit. It is noted that the partially hydrogenated block copolymer (d2) refers to the structure of above formula (13) in which n=1.

In the second and third embodiments, from the perspective of a low viscosity of the modified asphalt composition, and the perspective of a low melt viscosity of the paving binder composition, the lower limit of the content of the partially hydrogenated block copolymer (d2) is, based on 100% by mass of the partially hydrogenated block copolymer, preferably 15% by mass or more, more preferably 25% by mass or more, even more preferably 50% by mass or more, still even more preferably 65% by mass or more, and most preferably 70% by mass or more. Further, in the second embodiment, from the perspective of a high softening point and a high low-temperature ductility of the modified asphalt composition, and the perspective of a high softening point and a high low-temperature ductility of the paving binder composition, the upper limit of the content of the partially hydrogenated block copolymer (d2) is, based on 100% by mass of the partially hydrogenated block copolymer, preferably 90% by mass or less, more preferably 85% by mass or less, and even more preferably 80% by mass or less.

In the second and third embodiments, from the perspective of a low viscosity of the modified asphalt composition, and the perspective of a low melt viscosity of the paving binder composition, the partially hydrogenated block copolymer preferably comprises a partially hydrogenated block copolymer (r2) having a radial structure. Here, in the present specification, "radial structure" refers to a structure in which three or more polymers are bound to a residue X. Examples of such a structure include A-(B2-A)$_n$-X (n≥3), [(A-B2)$_k$]$_m$-X (m≥3), and [(A-B2)$_k$-A]$_m$-X (m≥3).

From the perspective of a low viscosity of the modified asphalt composition, and the perspective of a low melt viscosity of the paving binder composition, the partially hydrogenated block copolymer (r2) having a radial structure is preferably at least one structure selected from the group consisting of [(A-B2)$_k$]$_m$-X and [(A-B2)$_k$-A]$_m$-X (wherein m denotes an integer of 3 to 6 and k denotes an integer of 1 to 4; and more preferably m denotes an integer of 3 or 4).

In the second and third embodiments, from the perspective of the compatibility of the modified asphalt composition, and the perspective of a low melt viscosity of the paving binder composition, the upper limit of the degree of hydrogenation of the partially hydrogenated block copolymer is, based on the total number of moles of the conjugated diene monomer unit, preferably 95 mol % or less, more preferably 90 mol % or less, even more preferably 85 mol % or less, and still even more preferably 80 mol % or less. Further, from the perspective of the resistance to thermal aging during storage and fluidity resistance of the modified asphalt composition, and the perspective of a high heat resistance stability and a high heat discoloration resistance of the paving binder composition, the lower limit of the degree of hydrogenation of the partially hydrogenated block copolymer is preferably 10 mol % or more, more preferably 30 mol % or more, and even more preferably 40 mol % or more.

The degree of hydrogenation of the partially hydrogenated block copolymer can be adjusted by controlling the hydrogenation amount and the hydrogenation reaction time in the hydrogenation step, which is described later. Further, the degree of hydrogenation can be calculated by using the method described in the Examples, which are described below.

In the second and third embodiments, the content (TS) of the vinyl aromatic monomer unit in the partially hydrogenated block copolymer is preferably 30 to 60% by mass. From the perspective of excellent compatibility, a high softening point, heat resistance stability during storage, and the resistance to aggregate stripping of the modified asphalt composition, and the perspective of a high rutting resistance of the paving binder composition, the lower limit of the content of the vinyl aromatic monomer unit in the partially hydrogenated block copolymer is preferably 30% by mass or more, more preferably 33% by mass or more, even more preferably 36% by mass or more, and still even more preferably 40% by mass or more. Further, from the perspective of the compatibility, a low melt viscosity, and the flexibility of the modified asphalt composition, and the perspective of a low melt viscosity of the paving binder composition, the upper limit of the content of the vinyl aromatic monomer unit in the block copolymer is preferably 60% by mass or less, more preferably 55% by mass or less, even more preferably 50% by mass or less, and still even more preferably 45% by mass or less.

In the second and third embodiments, the lower limit of the content (BS) of the polymer block (A) comprising a vinyl aromatic monomer unit as a main component in the partially hydrogenated block copolymer is, from the perspective of a high softening point of the modified asphalt composition, and the perspective of a high rutting resistance of the paving binder composition, preferably 10% by mass or more, more preferably 15% by mass or more, and even more preferably 17% by mass or more. Further, in the second embodiment, from the perspective of compatibility with asphalt and the flexibility of the modified asphalt composition, and the perspective of a low melt viscosity of the paving binder composition, the upper limit of the content (BS) of the polymer block (A) comprising a vinyl aromatic monomer unit as a main component in the partially hydrogenated block copolymer is preferably 40% by mass or less, more preferably 35% by mass or less, even more preferably 28% by mass or less, and still even more preferably 25% by mass or less.

It is noted that the content (TS) of the vinyl aromatic monomer unit in the partially hydrogenated block copolymer and the content (BS) of the polymer block (A) comprising a vinyl aromatic monomer unit as a main component can be measured by using the method described in the Examples, which are described later.

The molecular weight distribution of the polymer block (A) comprising a vinyl aromatic monomer unit as a main component is, from the perspective of the fluidity resistance of the modified asphalt composition, and the perspective of a low melt viscosity of the paving binder composition, preferably 1.46 or less, more preferably 1.44 or less, even more preferably 1.42 or less, and still even more preferably 1.40 or less. Further, from the perspective of post-stretching resilience of the modified asphalt composition, and the perspective of a high rutting resistance of the paving binder composition, the molecular weight distribution of the polymer block (A) comprising a vinyl aromatic monomer unit as a main component is preferably 1.1 or more, more preferably 1.12 or more, even more preferably 1.14 or more, and still even more preferably 1.16 or more. The molecular weight distribution of the polymer block (A) comprising a vinyl aromatic monomer unit as a main component can be calculated by using the following formula. Molecular weight distribution of polymer block (A) comprising a vinyl aromatic monomer unit as a main component=(molecular weight of high molecular weight side at full width at half maximum of peak molecular weight of polymer block (A))/(molecular weight of low molecular weight side at full width at half maximum of peak molecular weight of polymer block (A))

In the second and third embodiments, in the partially hydrogenated block copolymer, the lower limit of the vinyl aromatic monomer unit content (RS) in the copolymer block (B2) comprising a conjugated diene monomer unit and a vinyl aromatic monomer unit is, from the perspective of the separation stability, resistance to thermal aging during storage, and post-stretching resilience of the modified asphalt composition, and the perspective of the compatibility of the paving binder composition, preferably 5% by mass or more based on the total mass of the copolymer block (B2), more preferably 20% by mass or more, and even more preferably 25% by mass or more.

In the second and third embodiments, the upper limit of the vinyl aromatic monomer unit content (RS) in the copolymer block (B2) is, from the perspective of reducing the amount of the partially hydrogenated block copolymer added to the asphalt, the separation stability of the modified asphalt composition, and flexibility, weather resistance, and resistance to aggregate stripping of the modified asphalt composition, as well as the perspective of a high rutting resistance of the paving binder composition, preferably 50% by mass or less based on the total mass of the copolymer block (B2), more preferably 35% by mass or less, and even more preferably 30% by mass or less.

The vinyl aromatic monomer unit content (RS) in the copolymer block (B2) is the ratio (mass %) of a value (TS−BS) obtained by subtracting the content (BS) of the polymer block (A) comprising a vinyl aromatic monomer unit as a main component, from the content (TS) of the vinyl aromatic monomer unit in the partially hydrogenated block copolymer. RS can be calculated based on the following formula.

$$RS(\text{mass \%})=(TS-BS)/(100-BS)\times 100$$

In the second and third embodiments, when the reaction time from the start of polymerization to the end of polymerization of the copolymer block (B2) is divided into three, namely, in order, a first stage, a middle stage, and a last stage, and when S1 (mass %) represents the vinyl aromatic monomer unit content in the copolymer block (B2) at the end of the first stage, S2 (mass %) represents the vinyl aromatic monomer unit content in the copolymer block (B2) at the end of the middle stage, and S3 (mass %) represents the vinyl aromatic monomer unit content in the copolymer block (B2) at the end of the last stage, from the perspective of compatibility of the modified asphalt composition and the perspective of compatibility of the paving binder composition, more preferable is a structure in which the relations S2/S1>1, and S3/S2>1 are satisfied. It is noted that the "start of polymerization" of the copolymer block (B2) is the point at which the starting material monomer of the copolymer block (B) is charged into the reactor, and the "end of polymerization" of the copolymer block (B2) is the point immediately before the starting material monomer of the copolymer block (A) is charged into the reactor. The vinyl aromatic monomer unit contents S1 to S3 can be measured by sampling the polymer solution at the end of the first stage, the end of the middle stage, and the end of the last stage, respectively.

In the second and third embodiments, the content of a short-chain vinyl aromatic monomer polymer moiety in the copolymer block (B2) is preferably 50% by mass or more. Setting the content of a short-chain vinyl aromatic monomer polymer moiety in the copolymer block (B2) within the above range tends to increase compatibility between the block copolymer and the asphalt, and to improve the after-stretching resilience, resistance to thermal aging, and resistance to aggregate stripping of the modified asphalt composition, and to improve the compatibility of the paving binder composition. The lower limit of the content of the short-chain vinyl aromatic monomer polymer moiety in the copolymer block (B2) is more preferably 70% by mass or more, even more preferably 80% by mass or more, and still even more preferably 90% by mass or more. The upper limit of the content of the short-chain vinyl aromatic monomer polymer moiety in the copolymer block (B2) is not particularly limited, but preferably is 99% by mass or less.

In the present specification, "short-chain vinyl aromatic monomer polymer moiety" is a moiety in which 2 to 6 vinyl aromatic monomer units are consecutive in the copolymer block (B2). The content of the short-chain vinyl aromatic monomer polymer moiety is determined as the content of the 2 to 6 consecutive vinyl aromatic monomer units in the copolymer block (B2), in which the content (RS) of the vinyl aromatic monomer units in the copolymer block (B2) is set to be 100% by mass. The method of measuring the content of the 2 to 6 consecutive vinyl aromatic monomer units is described in the Examples, which are described later.

In the copolymer block (B2) of the second and third embodiments, the content of the short-chain vinyl aromatic monomer polymer moiety in which two vinyl aromatic monomer units are consecutive is preferably 10% by mass or more and 45% by mass or less, more preferably 13% by mass or more and 42% by mass or less, and even more preferably 19% by mass or more and 36% by mass or less. The method of measuring the content of the two consecutive vinyl aromatic monomer units is described in the Examples, which are described later.

In the copolymer block (B2) of the second and third embodiments, the content of the short-chain vinyl aromatic monomer polymer moiety in which three vinyl aromatic monomer units are consecutive is preferably 45% by mass or more and 80% by mass or less, more preferably 45% by mass or more and 75% by mass or less, and even more preferably 45% by mass or more and 65% by mass or less. The method of measuring the content of the three consecutive vinyl aromatic monomer units is described in the Examples, which are described later.

The average vinyl content in the pre-hydrogenated conjugated diene monomer unit of the partially hydrogenated block copolymer of the second and third embodiments is preferably 15 mol % or more and less than 50 mol %, more preferably 18 mol % or more and 40 mol % or less, even more preferably 21 mol % or more and 35 mol % or less, and still even more preferably 24 mol % or more and 32 mol % or less. In the second embodiment, the vinyl content in the pre-hydrogenated conjugated diene monomer unit is preferably set to 15 mol % or more because the amount of the partially hydrogenated block copolymer to be added to asphalt tends to be reduced, and the melt viscosity of the paving binder composition tends to decrease. Further, the vinyl content in the pre-hydrogenated conjugated diene monomer unit is preferably set to less than 50 mol % because the resistance to thermal aging during storage and the weather resistance of the modified asphalt composition tend to increase, and the heat resistance stability and the heat discoloration resistance of the paving binder composition tend to improve. Here, the "vinyl content" refers to the percentage of pre-hydrogenated conjugated diene monomer units incorporated by 1,2 bonds and 3,4-bonds, based on the total amount of moles of the pre-hydrogenated conjugated diene monomer unit incorporated by 1,2-bonds, 3,4-bonds, and 1,4-bonds. It is noted that the vinyl content can be measured by NMR, and specifically, can be measured by using the method described in the Examples, which are described below.

In the second and third embodiments, the copolymer block (B2) comprising a conjugated diene monomer unit and a vinyl aromatic monomer unit may have a vinyl content distribution. The lower limit of the difference (hereinafter also referred to as "the vinyl content Δ") in the level of the vinyl content in (B2), which comprises a conjugated diene monomer unit and a vinyl aromatic monomer unit, of the partially hydrogenated block copolymer is, from the perspective of the low-temperature ductility of the modified asphalt composition, and the low-temperature ductility of the paving binder composition, preferably 5 mol % or more, more preferably 8 mol % or more, even more preferably 15 mol % or more, and still even more preferably 20 mol % or more. Further, from the perspective of the compatibility of the modified asphalt composition, and the perspective of the compatibility of the paving binder composition, the upper limit of the vinyl content Δ is preferably 30 mol % or less, more preferably 25 mol % or less, even more preferably 20 mol % or less, and still even more preferably 17 mol % or less.

In the copolymer block (B2) comprising a conjugated diene monomer unit and a vinyl aromatic monomer unit, when $V_1$ to $V_6$ respectively represent a vinyl content before hydrogenation of a first region to a sixth region each representing an equal mass in order from a polymerization start side, the distribution of the vinyl content is not particularly limited, and may be a uniform distribution, a tapered distribution, a convex distribution, or a concave distribution. In order to reduce the distribution of degree of hydrogenation H, the distribution of degree of hydrogenation H2, and L2/L1, the distribution of the vinyl content is preferably distributed into any of a tapered shape, a concave shape, or a convex shape. The vinyl distribution can be set to a tapered shape, a convex shape, or a concave shape by adding a polar compound during polymerization or by controlling the temperature of polymerization.

A tapered distribution is a distribution that satisfies $V_6>V_5>V_4>V_3>V_2>V_1$, or $V_6<V_5<V_4<V_3<V_2<V_1$. A convex distribution is a distribution in which $V_6$ and $V_1$ are smaller than $V_5$ and $V_2$, and $V_5$ and $V_2$ are smaller than $V_4$ and $V_3$. A concave distribution is a distribution in which $V_6$ and $V_1$ are larger than $V_5$ and $V_2$, and $V_5$ and $V_2$ are larger than $V_4$ and $V_3$.

In the second and third embodiments, the weight average molecular weight (Mw) of the partially hydrogenated block copolymer is preferably 100,000 to 500,000, more preferably 120,000 to 280,000, even more preferably 140,000 to 260,000, or still even more preferably 160,000 to 240,000. The weight average molecular weight (Mw) of the partially hydrogenated block copolymer is preferably 120,000 or more because the softening point and rutting resistance of the modified asphalt composition tend to improve, and the softening point and rutting resistance of the paving binder composition also tend to improve. Further, the weight average molecular weight (Mw) of the partially hydrogenated block copolymer is preferably 280,000 or less because the low-temperature ductility and discoloration resistance of the modified asphalt composition tend to improve, the melt viscosity tends to be lower, and workability tends to improve, and because the melt viscosity of the paving binder composition tends to improve.

In the second and third embodiments, the lower limit of the molecular weight distribution (Mw/Mn) (ratio of weight average molecular weight (Mw) to number average molecular weight (Mn)) of the partially hydrogenated block copolymer is, from the perspective of reducing the amount of the partially hydrogenated block copolymer to be added to the asphalt, and the perspective of a low melt viscosity of the paving binder composition, preferably 1.03 or more, more preferably 1.05 or more, even more preferably 1.11 or more, and still even more preferably 1.20 or more. Further, from the perspective of the producibility of the modified asphalt composition and reducing the amount of the partially hydrogenated block copolymer to be added to the asphalt, and the perspective of a low melt viscosity of the paving binder composition, the upper limit of the molecular weight distribution (Mw/Mn) of the partially hydrogenated block copolymer is preferably 2.0 or less, more preferably 1.7 or less, even more preferably 1.4 or less, and still even more preferably 1.3 or less. The weight average molecular weight (Mw), number average molecular weight (Mn) and the molecular weight distribution (Mw/Mn) of the polymer can be calculated by using the method described in the Examples, which are described below.

In the second and third embodiments, the lower limit of the peak temperature of the loss tangent (tan δ) obtained by measuring the dynamic viscoelasticity of the partially hydrogenated block copolymer is, from the perspective of a high compatibility with the asphalt and a short production time, and from the perspective of a high compatibility between the tackifier resin and oil of the paving binder composition, preferably −50° C. or more, more preferably −47° C. or more, and even more preferably −44° C. or more. Further, from the perspective of a short production time and the flexibility of the modified asphalt composition, and the perspective of a high low-temperature ductility of the paving binder composition, the upper limit of the peak temperature of the loss tangent (tan δ) obtained by measuring the dynamic viscoelasticity of the partially hydrogenated block copolymer is preferably −5° C. or less, more preferably −10° C. or less, even more preferably −15° C. or less, and still even more preferably −25° C. or less. The peak temperature of the loss tangent (tan δ) can be measured by using the method described in the Examples, which are described below. The peak temperature of the loss tangent (tan δ) can be adjusted within the above ranges by, for example, adjusting the vinyl bond content and vinyl aromatic monomer content of the middle block.

In the second and third embodiments, the peak height of the loss tangent (tan δ) in the range of −50° C. or more and −5° C. or less obtained by measuring the dynamic viscoelasticity of the partially hydrogenated block copolymer is, from the perspective of a short production time, a high post-stretching resilience, and a high resistance to thermal aging during storage of the modified asphalt composition, and the perspective of a high low-temperature ductility of the paving binder composition, preferably more than 0.7 and 1.6 or less, more preferably 0.8 or more and 1.8 or less, even more preferably 0.9 or more and 1.7 or less, and still even more preferably 1.0 or more and 1.5 or less. The peak height of the loss tangent (tan δ) can be measured by using the method described in the Examples, which are described later. It is noted that peak height of the loss tangent (tan δ) can be adjusted within the above range by, for example, adjusting the vinyl bond distribution and the distribution of degree of hydrogenation of the middle block.

In the second and third embodiments, from the perspective of the compatibility, the resistance to thermal aging during storage, and the mechanical properties of the modified asphalt composition, and the perspective of the compatibility of the paving binder composition, the partially hydrogenated block copolymer preferably comprises at least one functional group selected from the group consisting of a hydroxyl group, an acid anhydride group, an epoxy group, an amino group, an amide group, a silanol group, and an alkoxysilane group. Of these, the partially hydrogenated block copolymer more preferably comprises at least one functional group selected from the group consisting of an amino group and an amide group, and even more preferably comprises an amino group. The partially hydrogenated block copolymer more preferably comprises, based on 1 mole of the molecule, 2 moles or more of at least one functional group selected from the group consisting of an amino group and an amide group.

In the second and third embodiments, the lower limit of the melt flow rate (MFR, 200° C., 5 kgf) of the partially hydrogenated block copolymer is, from the perspective of a short production time of the modified asphalt composition, and the perspective of a low melt viscosity of the paving binder composition, preferably 0.1 g/10 minutes or more, more preferably 1 g/10 minutes or more, and even more preferably 2 g/10 minutes or more. Further, the upper limit of the melt flow rate (MFR, 200° C., 5 kgf) of the partially hydrogenated block copolymer is, from the perspective of reducing the amount of the partially hydrogenated block copolymer to be added to the asphalt and post-stretching resilience of the modified asphalt composition, and the perspective of a high rutting resistance of the paving binder composition, preferably 50 g/10 minutes or less, and more preferably 10 g/10 minutes or less.

<Method of Producing Partially Hydrogenated Block Copolymer>

The partially hydrogenated block copolymer of the second and third embodiments can be produced by performing a polymerization step for obtaining a block copolymer comprising: a polymer block (A) comprising a vinyl aromatic monomer unit as a main component; and a polymer block (B2) comprising a conjugated diene monomer unit and a vinyl aromatic monomer unit; by polymerizing at least a conjugated diene monomer and a vinyl aromatic monomer in a hydrocarbon solvent using a lithium compound as a polymerization initiator, performing after the polymerization step a hydrogenation step for hydrogenating a part of the double bonds in the conjugated diene monomer unit of the obtained block copolymer, and then performing a solvent-removing step for removing the solvent of the solution including the obtained partially hydrogenated block copolymer.

The polymerization step, the hydrogenation step, the solvent-removing step, and the like are the same as those described above, and hence a description thereof is omitted here.

<Modified Asphalt Composition>

In the second embodiment, the block copolymer of the present embodiment can be used in a modified asphalt composition. The modified asphalt composition of the second embodiment comprises 1 part by mass or more and 20 parts by mass or less of the partially hydrogenated block copolymer described above based on 100 parts by mass of asphalt. The content of the partially hydrogenated block copolymer in the modified asphalt composition is preferably 2 to 13 parts by mass based on 100 parts by mass of asphalt, and more preferably 3 to 10 parts by mass.

The asphalt is not particularly limited, and may be, for example, a by-product obtained during petroleum refining (petroleum asphalt), a naturally occurring product (natural asphalt), a mixture of such asphalts with a petroleum, or the like. The main component of the asphalt is what is generally referred to as bitumen.

Examples of the asphalt include, but are not particularly limited to, straight asphalt, semi-blown asphalt, blown asphalt, solvent deasphalting asphalt, tar, pitch, oil-added cutback asphalt, asphalt emulsion, and the like. From the perspective of availability, the asphalt is preferably straight asphalt. These examples may be used alone or as a mixture. Further, an aromatic heavy mineral oil, such as a petroleum-based solvent extracted oil, an aromatic hydrocarbon process oil or extract may be added to the various asphalts.

The asphalt preferably has a penetration (measured in accordance with JIS-K2207) of 30 or more and 300 or less, more preferably 50 or more and 250 or less, and even more preferably 60 or more and 200 or less. If the asphalt has a penetration within the above range, the balance among the softening point, ductility, melt viscosity, rutting resistance, and heat resistance stability during storage of the modified asphalt composition tends to improve.

In the second embodiment, from the perspective of shortening the production time of the modified asphalt composition, the compatibility of the asphalt composition, improving the resistance to aggregate stripping, the modified asphalt composition preferably comprises the above-mentioned tackifier resin.

Examples of the tackifier resin may include a rosin resin, a hydrogenated rosin resin, a terpene resin, a coumarone resin, a phenol resin, a terpene-phenol resin, an aromatic hydrocarbon resin, an aliphatic hydrocarbon resin, and the like.

The tackifier resin may be used alone or in combination of two or more. Specific examples of tackifier resins include those described in "Chemicals for Rubber/Plastics" (by Rubber Digest, Co., Ltd., Japan). From the perspective of a high compatibility of the modified asphalt composition and improving the resistance to aggregate stripping, an aromatic hydrocarbon resin is preferable.

In the second embodiment, the content of the tackifier resin in the modified asphalt composition is preferably more than 0 parts by mass and 200 parts by mass or less based on 100 parts by mass of the partially hydrogenated block copolymer, and more preferably 3 parts by mass or more and 100 parts by mass or less. If the tackifier resin content is in the above range, compatibility and resistance to aggregate stripping tend to improve.

In the second embodiment, from the perspective of obtaining a low viscosity and a high compatibility of the modified asphalt composition, the modified asphalt composition preferably comprises an oil. Examples of oil include, but are not particularly limited to, mineral oil softening agents and synthetic resin softening agents. Examples of mineral oil softening agents generally include paraffinic oils, naphthenic oils, aromatic oils, and the like.

It is noted that, in general, oils in which a paraffinic hydrocarbon carbon atom number is 50% or more of the total number of carbon atoms included in the oil are referred to as a "paraffinic oil", oils in which a naphthenic hydrocarbon carbon atom number is 30% or more and 45% or less are referred to as a "naphthenic oil", and oils in which an aromatic hydrocarbon carbon atom number is 35% or more are referred to as an "aromatic oil".

As a result of including a mineral oil softening agent, the installability of the modified asphalt composition is improved. From the perspective of a low viscosity and low-temperature performance of the asphalt composition, the mineral oil softening agent is preferably a paraffinic oil, and from the perspective of a low viscosity and a high compatibility of the asphalt composition, the mineral oil softening agent is preferably a naphthenic oil.

Further, examples of the synthetic resin softening agent include, but are not particularly limited to, polybutene and low molecular weight polybutadiene.

In the second embodiment, the oil content in the modified asphalt composition is, from the perspective of suppressing oil bleed and securing a sufficient mechanical strength in practice of the modified asphalt composition, preferably 10 to 50 parts by mass based on 100 parts by mass of the above partially hydrogenated block copolymer, more preferably 15 to 40 parts by mass, and more preferably 20 to 30 parts by mass.

In the second embodiment, from the perspective of a high softening point, compatibility, and improving the high-temperature storage stability of the modified asphalt composition, the asphalt composition preferably comprises a cross-linking agent. Examples of the cross-linking agent include, but are not particularly limited to, sulfur, sulfur compounds, inorganic vulcanizing agents other than sulfur, oximes, nitroso compounds, polyamines, organic peroxides, resin cross-linking agents, isocyanate compounds, polyphosphoric acid, and crosslinking aids.

In the second embodiment, from the perspective of a high softening point, compatibility, and resistance to thermal aging during storage of the modified asphalt composition, the cross-linking agent is preferably sulfur, a sulfur compound, or polyphosphoric acid.

In the second embodiment, the lower limit of the added amount of the cross-linking agent in the modified asphalt composition is, from the perspective of a high compatibility between a conjugated diene copolymer and the asphalt, a high resistance to mass loss during oil adherence to the modified asphalt mixture, and a high resistance to a decrease in strength, preferably 0.02% by mass or more based on the total mass of the modified asphalt composition, more preferably 0.04% by mass or more, and even more preferably 0.06% by mass or more. Further, from the perspective of obtaining a modified asphalt composition having a high penetration, the added amount of the cross-linking agent in the modified asphalt composition is, as described in Japanese Patent Laid-Open No. 2013-520543, preferably about 20 to 60% by mass based on the total mass of the modified asphalt composition. The upper limit of the added amount of the cross-linking agent in the modified asphalt composition is, from the perspective of obtaining a modified asphalt composition having a high penetration and from the perspective of economic efficiency, preferably 1.0% by mass or less based on the total mass of the modified asphalt composition, more preferably 0.4% by mass or less, and even more preferably 0.2% by mass or less.

In the second embodiment, from the perspective of sufficiently reacting the conjugated diene copolymer and the cross-linking agent, the mixing time after the cross-linking agent is added to the modified asphalt composition is preferably 20 minutes or more, more preferably 40 minutes or more, even more preferably 60 minutes or more, and most preferably 90 minutes or more. Further, from the perspective of suppressing heat degradation of the conjugated diene copolymer, the mixing time after the cross-linking agent is added to the modified asphalt composition is preferably 5 hours or less, and more preferably less than 3 hours.

In the second embodiment, from the perspective of decreasing the viscosity of the modified asphalt composition, and the perspective of further shortening the production time of the modified asphalt composition, a foaming agent may be included during modified asphalt composition production.

In the second embodiment, examples of the foaming agent include sodium hydrogen carbonate, ammonium carbonate, diazoaminobenzene, N,N'-dinitrosopentamethylenetetramine, 2,2'-azobis(isobutyronitrile), and the like. From the perspective of compatibility with the modified asphalt composition, diazoaminobenzene, N,N'-dinitrosopentamethylenetetramine, and 2,2'-azobis(isobutyronitrile) are preferable.

In the second embodiment, the added amount of the foaming agent in the modified asphalt composition is, from the perspective of a low viscosity and a short production time of the modified asphalt composition, preferably 0.1% by mass, and more preferably 0.3% by mass or more. Further, from an economic perspective, the added amount of the foaming agent in the modified asphalt composition is preferably 3% by mass or less, more preferably 2% by mass or less, and even more preferably 1% by mass or less.

In the second embodiment, the modified asphalt composition may comprise other additives that are generally used in blending of a thermoplastic resin or a rubbery polymer. Examples of other additives include inorganic fillers, lubricants, mold release agents, plasticizers, antioxidants, stabilizers, flame retardants, antistatic agents, reinforcing agents such as organic fiber, glass fiber, carbon fiber, and metal whisker, coloring agents, pigments, viscosity modifiers, anti-stripping agents, pigment dispersing agents, and the like. The content of the other additives is not particularly limited, but is generally 50 parts by mass or less based on 100 parts by mass of asphalt.

In the second embodiment, examples of the inorganic filler include calcium carbonate, magnesium carbonate, magnesium hydroxide, calcium sulfate, barium sulfate, silica, clay, talc, mica, wollastonite, montmorillonite, zeolite, alumina, titanium oxide, magnesium oxide, zinc oxide, slug wool, and glass fibers.

In the second embodiment, examples of lubricants / mold release agents include pigments such as carbon black and iron oxide, stearic acid, behenic acid, zinc stearate, calcium stearate, magnesium stearate, and ethylenebisstearamide.

In the second embodiment, examples of stabilizers include antioxidants, light stabilizers, and the like.

In the second embodiment, examples of antioxidants include phenolic antioxidants such as radical scavengers, phosphorus antioxidants and sulfur antioxidants such as peroxide decomposers, and the like. Further, antioxidants combining both functions may also be used. These may be used alone or in combination of two or more. Of these, from the perspectives of resistance to thermal aging and suppressing gelation of the block copolymer, a phenolic antioxidant is preferred. Examples of antioxidants include, but are not particularly limited to, hindered phenol antioxidants such as 2,6-di-t-butyl-4-methylphenol, n-octadecyl 3-(4'-hydroxy-3', 5'-di-t-butylphenyl)propionate, 2,2'-methylenebis(4-methyl-6-t-butylphenol), 2,2'-methylenebis(4-ethyl-6-t-butylphenol), 2,4-bis [(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, 2-[1-(2-hydroxy-3,5-di-tert-pentylphenyl)]acrylate; sulfur antioxidants such as dilauryl thiodipropionate and lauryl stearyl thiodipropionate pentaerythritol-tetrakis($\beta$-laurylthiopropionate); phosphorus antioxidants such as tris(nonylphenyl)phosphite and tris(2,4-di-t-butylphenyl)phosphite, and the like.

In the second embodiment, examples of light stabilizers include benzotriazole ultraviolet absorbers such as 2-(2'-hydroxy-5'-methylphenyl)benzotriazole, 2-(2'-hydroxy-3', 5'-t-butylphenyl)benzotriazole, and 2-(2'-hydroxy-3',5'-di-t-butylphenyl)-5-chlorobenzotriazole; benzophenone ultraviolet absorbers such as 2-hydroxy-4-methoxybenzophenone; and hindered amine light stabilizers.

In the second embodiment, the anti-stripping agent can prevent the aggregate from detaching from the modified asphalt composition when the modified asphalt composition is mixed with the aggregate. The anti-stripping agent is preferably, for example, a resin acid. Examples thereof include polycyclic diterpenes having a carboxyl group and 20 carbon atoms, such as rosins comprising at least one of abietic acid, dehydroabietic acid, neoabietic acid, pimaric acid, isopimaric acid, palustric acid. Further, an aliphatic acid or an aliphatic acid amide can serve as the anti-stripping agent and the lubricant.

In the second embodiment, the modified asphalt composition may comprise a rubber component other than the partially hydrogenated block copolymer (hereinafter also referred to simply as "rubber component"). Examples of the rubber component other than the partially hydrogenated block copolymer include natural rubber and synthetic rubbers. Examples of synthetic rubbers include olefin elastomers such as polyisoprene rubber, polybutadiene rubber (BR), styrene butadiene rubber (SBR), modified styrene butadiene rubber (modified SBR), a styrene-butadiene-styrene block copolymer (SBS), a styrene-ethylene-butylene-styrene block copolymer (SEBS), a styrene-butylene-butadiene-styrene copolymer (SBBS), and ethylene propylene copolymer (EPDM); chloroprene rubber, acrylic rubber, an ethylene vinyl acetate copolymer (EVA), an ethylene-ethyl acrylate copolymer (EEA), nitrile butadiene rubber (NBR), and the like.

From the perspective of a high compatibility of the modified asphalt composition and improving the resistance to aggregate stripping, the rubber component other than the partially hydrogenated block copolymer is preferably polyisoprene rubber, polybutadiene rubber, styrene butadiene rubber, a styrene-butadine-styrene block copolymer, or an ethylene vinyl acetate copolymer, and more preferably polybutadiene rubber or a styrene-butadiene-styrene block copolymer.

The rubber component other than the partially hydrogenated block copolymer may have a functional group. From the perspective of improving fluidity resistance, an olefin elastomer or an olefin elastomer having a functional group is preferably used as the rubber component.

When the rubber component other than the partially hydrogenated block copolymer has a functional group, the functional group is preferably at least one functional group selected from the group consisting of a hydroxyl group, an acid anhydride group, an epoxy group, an amino group, an amide group, a silanol group, and an alkoxysilane group. The rubber component other than the partially hydrogenated block copolymer may be used alone, or two or more kinds may be used in combination.

In the second embodiment, in the modified asphalt composition, the content of the rubber component other than the partially hydrogenated block copolymer is preferably 0.5 to 400 parts by mass based on 100 parts by mass of the above partially hydrogenated block copolymer, more preferably 0.5 to 300 parts by mass, even more preferably 1 to 200 parts by mass, and most preferably 5 to 150 parts by mass. If the content of the rubber component other than the partially hydrogenated block copolymer is in the above range, the effect of an improvement in the compatibility and resistance to aggregate stripping of the modified asphalt composition can be more reliably obtained.

In the second embodiment, the modified asphalt composition may comprise a resin component other than the partially hydrogenated block copolymer of the present embodiment. Examples of resin components other than the partially hydrogenated block copolymer of the present embodiment include, but are not limited to, thermoplastic resins such as polyethylene (PE), low density polyethylene (low density PE), polyvinyl chloride (PVC), polyamide (PA), polystyrene (PS), acrylic resin, polycarbonate (PC), polyethylene terephthalate (PET), polybutylene terephthalate (PBT), polyvinylidene fluoride (PVDF), Teflon (R) (PTFE), polyetheretherketone (PEEK), polyphenylene sulfide (PPS), polyimide (PI), and polyamideimide (PAI).

From the perspective of improving a high compatibility and the resistance to aggregate stripping of the modified asphalt composition, the resin component other than the partially hydrogenated block copolymer of the present embodiment is more preferably polyethylene (PE), low density polyethylene (low density PE), polyvinyl chloride (PVC), or polyamide (PA).

The resin component other than the partially hydrogenated block copolymer may have a functional group. When the resin component has a functional group, the functional group is preferably at least one functional group selected from the group consisting of a hydroxyl group, an acid anhydride group, an epoxy group, an amino group, an amide group, a silanol group, and an alkoxysilane group. The resin component other than the partially hydrogenated block copolymer may be used alone, or two or more kinds may be used in combination.

In the second embodiment, the content of the resin component other than the partially hydrogenated block copolymer in the modified asphalt composition is preferably 0.5 to 400 parts by mass based on 100 parts by mass of the above-mentioned partially hydrogenated block copolymer, more preferably 0.5 to 300 parts by mass, even more preferably 1 to 200 parts by mass, and most preferably 5 to 150 parts by mass. If the content of the resin component other than the partially hydrogenated block copolymer is in the above range, the effect of an improvement in the compatibility and resistance to aggregate stripping of the modified asphalt composition can be more reliably obtained.

In the second embodiment, the modified asphalt composition may comprise, as the resin component other than the partially hydrogenated block copolymer of the present embodiment, a polymer comprising as a main component a vinyl aromatic monomer unit and having a weight average molecular weight (Mw) of 5,000 to 30,000 (hereinafter also referred to simply as "low molecular weight vinyl aromatic polymer"). The low molecular weight vinyl aromatic polymer preferably comprises the vinyl aromatic monomer unit included in the polymer block (A) of the present embodiment as a main component, and more preferably comprises a monomer unit derived from polystyrene as a main component.

In the second embodiment, from the perspective of reducing the viscosity of the modified asphalt composition, the lower limit of the content of the molecular weight vinyl aromatic polymer is preferably 0.5 parts by mass or more based on 100 parts by mass of the partially hydrogenated block copolymer, more preferably 1.0 part by mass or more, even more preferably 2.0 parts by mass or more, and still even more preferably 3.0 parts by mass or more. Further, from the perspective of a low softening point of the modified asphalt composition, the upper limit of the content of the low molecular weight vinyl aromatic polymer is preferably 5.0 parts by mass or less based on 100 parts by mass of the partially hydrogenated block copolymer, more preferably 4.0 parts by mass or less, even more preferably 3.0 parts by mass or less, and still even more preferably 2.0 parts by mass or less.

A preferable method of preparing the low molecular weight vinyl aromatic polymer is as explained in the first embodiment, and a description thereof is omitted here.

In the second embodiment, a commercially-available low molecular weight vinyl aromatic polymer may be mixed with the partially hydrogenated block copolymer of the present embodiment.

In the second embodiment, the modified asphalt composition can be produced by mixing 1 part by mass or more and 20 parts by weight or less of the partially hydrogenated block copolymer described above with 100 parts by mass of asphalt.

The mixing method is not particularly limited, and can be carried out using any mixer. Examples of the mixer include melt mixers such as extruders, kneaders, and a Banbury mixer, stirrers such as a vertical impeller and a side arm impeller, a homogenizer including an emulsifier, a pump, and the like.

It is preferable to mix the asphalt, the partially hydrogenated block copolymer, and the optional additives in the range of 140 to 220° C. using a stirring tank and the like.

<Modified Asphalt Mixture>

In the second embodiment, the modified asphalt mixture comprises the above-described modified asphalt composition and an aggregate.

The aggregate is not especially limited, and any paving aggregate set forth in "Manual for Asphalt Pavement" published by the Japan Road Association may be used. Specific examples of the aggregate include crushed stone, cobble stone, gravel, steel slag, and the like. Further, an asphalt-coated aggregate obtained by coating such an aggregate with asphalt, a recycled aggregate, and the like may also be used. In addition, granular materials similar to these, artificial calcined aggregates, calcined foamed aggregates, artificial lightweight aggregates, ceramic grains, luxovite, aluminum grains, plastic grains, ceramics, emery, construction debris, and fibers can also be used.

In general, aggregates are broadly classified into coarse aggregates, fine aggregates, and fillers.

Coarse aggregates are aggregates that remain on a 2.36 mm sieve, and generally have varieties such as No. 7 crushed stone having a grain size of 2.5 to 5 mm, No. 6 crushed stone having a grain size of 5 to 13 mm, No. 5 crushed stone having a grain size of 13 to 20 mm, and, further, No. 4 crushed stone having a grain size of 20 to 30 mm. In the asphalt mixture of the present embodiment, an aggregate obtained by mixing one kind or two or more kinds of these coarse aggregates having various grain sizes, or a synthesized aggregate, for example, can be used. These coarse aggregates may be coated with straight asphalt in an amount of about 0.3 to 1% by mass based on the aggregates.

Fine aggregates refer to aggregates that pass through a 2.36 mm sieve and remain on a 0.075 mm sieve, and examples include river sand, dune sand, pit sand, sea sand, screenings, crushed stone dust, silica sand, artificial sand, glass cullet, foundry sand, and recycled aggregate crushed sand.

Fillers refer to aggregates that pass through a 0.075 mm sieve, and examples include filler portions of screenings, stone powder, slaked lime, cement, incinerator ash, clay, talc, fly ash, and carbon black. In addition, rubber particles, cork particles, wood particles, resin particles, fiber particles, pulp, artificial aggregates, and the like can even be used as fillers as long as they pass through a 0.075 mm sieve.

The coarse aggregate, fine aggregate, or filler may be used alone, but in general two kinds or more are mixed together and used.

The asphalt mixture of the present embodiment can be produced, at least, by mixing the modified asphalt composition of the present embodiment and the aggregate. The mixing method is not particularly limited.

The temperature at which the modified asphalt composition and the aggregate are mixed can be set in the range of, generally, 120° C. or more and 200° C. or less.

The content of the aggregate in the asphalt mixture is, from the perspective of obtaining an asphalt mixture having a high resistance to mass loss during oil adherence and a high resistance to a decrease in strength, preferably in the range of 85% by mass or more and 98% by mass or less, and more preferably 90% by mass or more and 97% by mass or less.

Further, as the method of producing the asphalt mixture, a so-called plant mixing method, in which the asphalt is modified by directly mixing with the partially hydrogenated block copolymer of the present embodiment when mixing the asphalt and the aggregate, can also be used.

<Method of Using Modified Asphalt Composition and Modified Asphalt Mixture>

The modified asphalt composition and modified asphalt mixture of the present embodiment may be used for the various applications described in The Shell Bitumen Handbook edited by D. Whiteoak and published by Shell Bitumen U.K. in the United Kingdom in 1990. Other applications include waterproof sheets, roof coatings, primer adhesives for waterproof sheets, paving sealing binders, adhesives in recycled asphalt paving, binders for cold prepared asphaltic concrete, fiberglass mat binders, slip coatings for concrete, protective coatings for concrete, crack sealants for pipelines and articles made of iron, and the like.

Examples of paving modes using the modified asphalt composition of the present embodiment include, but are not particularly limited to, dense-graded pavement, drainage pavement, water-permeable pavement, dense and gap-graded asphalt pavement, crushed stone mastic asphalt pavement, color pavement, semi-flexible pavement, water retaining pavement, and thin layer pavement.

Examples of production methods for obtaining each of those paving modes include, but are not particularly limited to, a high-temperature method, a medium-temperature method, and a normal-temperature method.

From the perspective of improving fluidity resistance and skid resistance, an asphalt mixture to be used for dense-graded pavement preferably comprises, based on 100% by mass of the total amount of aggregate, 40 to 55% by mass of coarse aggregate, 40 to 55% by mass of fine aggregate, and 3 to 10% by mass of filler. The modified asphalt mixture to be used for dense-graded pavement preferably comprises, based on 100 parts by mass of the total amount of aggregate, 5 to 7 parts by mass of the modified asphalt composition, and based on 100 parts by mass of asphalt, 3 to 5.5 parts by mass of the partially hydrogenated block copolymer of the present embodiment.

From the perspective of improving drainage properties, visibility, and noise, a modified asphalt mixture to be used for drainage pavement preferably comprises, based on 100% by mass of the total amount of aggregate, 60 to 85% by mass of coarse aggregate, 5 to 20% by mass of fine aggregate, and 3 to 20% by mass of filler. The modified asphalt mixture to be used for drainage pavement preferably comprises, based on 100 parts by mass of the total amount of aggregate, 4 to 6 parts by mass of the modified asphalt composition, and based on 100 parts by mass of asphalt, 5 to 10 parts by mass of the partially hydrogenated block copolymer of the present embodiment.

From the perspective of improving water permeability, a modified asphalt mixture to be used for water-permeable pavement preferably comprises, based on 100% by mass of the total amount of aggregate, 60 to 85% by mass of coarse aggregate, 5 to 20% by mass of fine aggregate, and 3 to 20% by mass of filler. The modified asphalt mixture to be used for water-permeable pavement preferably comprises, based on 100 parts by mass of the total amount of aggregate, 4 to 6 parts by mass of the modified asphalt composition, and based on 100 parts by mass of asphalt, more than 0 to 6 parts by weight of the partially hydrogenated block copolymer of the present embodiment.

From the perspective of improving wear resistance, fluidity resistance, durability, and skid resistance, a modified asphalt mixture to be used for dense and gap-graded pavement preferably comprises, based on 100% by mass of the total amount of aggregate, 50 to 60% by mass of coarse aggregate, 30 to 40% by mass of fine aggregate, and 3 to 10% by mass of filler. The modified asphalt mixture to be used for dense and gap-graded pavement preferably comprises, based on 100 parts by mass of the total amount of aggregate, 4.5 to 6 parts by mass of the modified asphalt composition, and based on 100 parts by mass of asphalt, 5 to 12 parts by mass of the partially hydrogenated block copolymer of the present embodiment.

From the perspective of improving wear resistance, water impermeability, stress relaxation properties, fluidity resistance and noise, a modified asphalt mixture to be used for crushed stone mastic asphalt pavement preferably comprises, based on 100% by mass of the total amount of aggregate, 55 to 70% by mass of coarse aggregate, 15 to 30% by mass of fine aggregate, and 5 to 15% by mass of filler. The modified asphalt mixture to be used for crushed stone mastic asphalt pavement preferably comprises, based on 100 parts by mass of the total amount of aggregate, 5.5 to 8 parts by mass of the modified asphalt composition, and based on 100 parts by mass of asphalt, 4 to 10 parts by mass of the partially hydrogenated block copolymer of the present embodiment.

From the perspective of suppressing an increase in pavement temperature and improving water retention, a modified asphalt mixture to be used for water retaining pavement preferably comprises, based on 100% by mass of the total amount of aggregate, 60 to 85% by mass of coarse aggregate, 5 to 20% by mass of fine aggregate, and 3 to 20% by mass of filler. The modified asphalt mixture to be used for water retaining pavement preferably comprises, based on 100 parts by mass of the total amount of aggregate, 4 to 6 parts by mass of the modified asphalt composition, and based on 100 parts by mass of asphalt, 4 to 10 parts by mass of the partially hydrogenated block copolymer of the present embodiment. The modified asphalt mixture to be used for water retaining pavement preferably has a porosity of about 15 to 20%, and gaps are filled with a water retaining material such as cement or plaster.

From the perspective of economic efficiency, shortening construction time, and installability, a modified asphalt mixture to be used for thin layer pavement preferably comprises, based on 100% by mass of the total amount of aggregate, 60 to 85% by mass of coarse aggregate, 5 to 20% by mass of fine aggregate, and 3 to 20% by mass of filler. The modified asphalt mixture to be used for thin layer pavement preferably comprises, based on 100 parts by mass of the total amount of aggregate, 4 to 6.5 parts by mass of the modified asphalt composition, and based on 100 parts by mass of asphalt, 4 to 8 parts by mass of the partially hydrogenated block copolymer of the present embodiment. The coarse aggregate in the modified asphalt mixture to be used for thin layer pavement is preferably No. 7 crushed stone having a grain size in the range of 2.5 to 5 mm.

The modified asphalt composition of the second embodiment can be suitably used even as an asphalt waterproof sheet composition.

Using the modified asphalt composition of the second embodiment enables the softening point and the low-temperature bending properties of the asphalt waterproof sheet to be improved.

The content of the partially hydrogenated block copolymer of the present embodiment in the asphalt waterproof sheet composition is, from the perspective of a high softening point and better cracking resistance at low temperatures, preferably 5% by mass or more based on 100% by mass of the total of the asphalt and the partially hydrogenated block copolymer, more preferably 7% by mass or more, and even more preferably 9% by mass or more. On the other hand, from the perspective of producibility and economic efficiency of the asphalt waterproof sheet composition, the content of the partially hydrogenated block copolymer is preferably 20% by mass or less based on 100% by mass of the total of the asphalt and the partially hydrogenated block copolymer, more preferably 17% by mass or less, and even more preferably 14% by mass or less.

In addition to the partially hydrogenated block copolymer of the present embodiment, various polymers, tackifiers, softening agents, antioxidants, anti-weathering agents, inorganic fillers, lubricants, mold release agents, and cross-linking agents can be used in the composition for an asphalt waterproofing sheet as necessary.

In the case where the asphalt waterproofing sheet is to be installed at normal temperature, from the perspective of a high low-temperature usability of the asphalt waterproofing sheet, a low melt viscosity of the composition for an asphalt waterproofing sheet, and high installability, it is preferable to use asphalt having a penetration of 80 or more, more preferably 100 or more, even more preferably 130 or more, and yet more preferably 160 or more.

In the case of installing the asphalt waterproofing sheet at a high temperature by a torch-applied method, in order to prevent the viscosity of the composition for an asphalt waterproofing sheet from becoming excessively low, asphalt having a penetration of 30 or more and 150 or less is preferable, more preferable is asphalt having a penetration of 60 or more and 120 or less, and even more preferable is asphalt having a penetration of 80 or more and 100 or less.

From the perspective of a high low-temperature usability of the asphalt waterproofing sheet, a low melt viscosity of the composition for an asphalt waterproofing sheet, and high installability, it is preferable that the asphalt waterproofing sheet composition comprises a softening agent. From the perspective of enhancing the effects, oil is preferable, and process oil is more preferable. Moreover, an inorganic filler may be used as necessary.

Examples of methods for installing the asphalt waterproofing sheet include a high-temperature method, a torch-applied method, a self-adhesive method, and a combined method. The composition for an asphalt waterproofing sheet, in which the block copolymer of the present embodiment is used, is highly resistant to thermal aging and, therefore, can be suitably used in a high-temperature method and a torch-applied method.

<Paving Binder Composition>

In the third embodiment, the partially hydrogenated block copolymer of the present embodiment can be used in a paving binder composition. The paving binder composition of the third embodiment comprises 20 to 70% by mass of a tackifier resin, 20 to 70% by mass of an oil, and 2 to 15% by mass of the partially hydrogenated block copolymer of the present embodiment.

The paving binder composition of the third embodiment comprises a specific amount of the partially hydrogenated block copolymer of the present embodiment, and hence has excellent transparency and heat discoloration resistance during production. Therefore, compared with a modified asphalt composition comprising black asphalt, coloration from the natural color of a material is remarkable even without adding a colorant, such as a pigment. Consequently, in the third embodiment, the paving binder composition also encompasses pavings that exhibit the natural color of a material even without adding a colorant, such as a pigment. From the perspective of color producibility, the paving binder composition of the third embodiment preferably comprises a colorant, such as a pigment, to actively express color.

In the third embodiment, the lower limit of the content of the partially hydrogenated block copolymer of the present embodiment in the paving binder composition is, from the perspective of a high softening point, high low-temperature ductility, and a high rutting resistance, based on 100% by mass of the paving binder composition, preferably 2% by mass or more, more preferably 4% by mass or more, and even more preferably 6% by mass or more. Further, from the perspective of a low melt viscosity of the paving binder composition, the upper limit of the content of the partially hydrogenated block copolymer of the present embodiment is, based on 100% by mass of the paving binder composition, preferably 15% by mass or less, more preferably 13% by mass or less, and even more preferably 11% by mass or less.

In the third embodiment, as the tackifier resin, the same tackifier resins as mentioned in examples in the second embodiment can be used.

In the third embodiment, the lower limit of the content of the tackifier resin in the paving binder composition is, from the perspective of a low melt viscosity, based on 100% by mass of the paving binder composition, preferably 20% by mass or more, more preferably 25% by mass or more, and even more preferably 30% by mass or more. Further, from the perspective of a high low-temperature ductility and a high rutting resistance of the paving binder composition, the upper limit of the content of the tackifier resin is, based on 100% by mass of the paving binder composition, preferably 70% by mass or less, more preferably 60% by mass or less, and even more preferably 55% by mass or less.

In the third embodiment, as the oil, the same oils as mentioned in examples in the second embodiment can be used.

In the third embodiment, the lower limit of the content of the oil in the paving binder composition is, from the perspective of a low melt viscosity, based on 100% by mass of the paving binder composition, preferably 20% by mass or more, more preferably 25% by mass or more, and even more preferably 30% by mass or more. Further, from the perspective of a high low-temperature ductility and a high rutting resistance of the paving binder composition, the upper limit of the content of the oil is, based on 100% by mass of the paving binder composition, preferably 70% by mass or less, more preferably 65% by mass or less, and even more preferably 60% by mass or less.

In the third embodiment, as the pigment, an inorganic pigment, for example, at least one pigment selected from the group consisting of iron oxide, chromium oxide, iron hydroxide, and titanium oxide, may be used.

In the third embodiment, the content of the pigment in the paving binder composition is, from the perspective of color producibility, based on 100% by mass of the paving binder composition, preferably 0.05% by mass or more, and more preferably 0.1% by mass or more. Further, from the perspective of compatibility and economic efficiency of the paving binder composition, the content of the pigment is, based on 100% by mass of the paving binder composition, preferably 3% by mass or less, and more preferably 1% by mass or less.

From the perspective of improving the adhesion to the aggregate (also referred to as "resistance to aggregate stripping"), the paving binder composition of the third embodiment preferably comprises an anti-stripping agent.

In the third embodiment, examples of the anti-stripping agent include: anionic compounds such as a higher fatty acid or a metal salt of a higher fatty acid represented by an inorganic compound such as slaked lime, an acidic organic phosphorus compound, maleic anhydride, and a maleated organic compound; cationic compounds represented by an amine organic compound and the like; amphoteric polymer compounds having both a cation and an anion in one molecule, represented by fatty acid salts of aliphatic amines, and the like. Of these, from the perspective of high resistance to aggregate stripping of the paving binder composition, the anti-stripping agent is preferably an amphoteric polymer compound. Commercially-available products include Neoguard S-100 (trade name, manufactured by Toho Chemical Industry Co., Ltd.) and the like.

In the third embodiment, the content of the anti-stripping agent in the paving binder composition is, from the perspective of resistance to aggregate stripping, preferably 0.1% by mass or more based on 100% by mass of the paving binder composition, and more preferably 0.3% by mass or more. Further, from the perspective of compatibility and economic efficiency of the paving binder composition, the content of the anti-stripping agent in the paving binder composition is preferably 3% by mass or less based on 100% by mass of the paving binder composition, and more preferably 1% by mass or less.

In the third embodiment, the paving binder composition may comprise additives. The additives are not particularly limited as long as they are generally used in blending of a thermoplastic resin or a rubbery polymer. Examples thereof may include inorganic fillers, dyes, lubricants, mold release agents, plasticizers, antioxidants, stabilizers, flame retardants, antistatic agents, reinforcing agents such as organic fiber, glass fiber, carbon fiber, and metal whisker, viscosity modifiers, pigment dispersing agents, and the like. The content of the additives in the paving binder composition is not particularly limited, and may be selected as appropriate. However, the content is generally 50 parts by mass or less based on 100 parts by mass of paving binder composition.

<Method of Producing Paving Binder Composition>

The paving binder composition can be produced by, for example, mixing 20 to 70% by mass of a tackifier resin, 20 to 70% by mass of an oil, and 2 to 15% by mass of the partially hydrogenated block copolymer of the present embodiment.

The mixing method is not particularly limited, and can be carried out by using a stirring tank (the stirring method can be carried out by using a stirrer such as a vertical impeller and a side arm impeller, a homogenizer including an emulsifier, or a pump), or a melt mixer such as an extruder, a kneader, and a Banbury mixer. The mixing temperature is generally in the range of 140° C. to 220° C.

<Paving Binder Mixture>

In the third embodiment, a paving binder mixture comprises the above-described paving binder composition and an aggregate.

In the third embodiment, the aggregate is not particularly limited, and the same aggregates as used in the modified asphalt composition mentioned in the second embodiment can be used. The aggregate is preferably a colored aggregate.

In the third embodiment, the paving binder mixture can be produced by mixing the paving binder composition and the aggregate.

A mixing method is not particularly limited, and the same method as in the production method of the paving binder composition can be used. The temperature at which the paving binder composition and the aggregate are mixed can generally be set in the range of 120° C. or more and 200° C. or less.

The content of the aggregate in the paving binder mixture is not particularly limited, but from the perspective of obtaining an asphalt composition having a high resistance to mass loss during oil adherence and a high resistance to a decrease in strength, the content is preferably in the range of 85% by mass or more and 98% by mass or less, and more preferably 97% by mass or more and 90% by mass or less.

<Method of Using Paving Binder Composition and Paving Binder Mixture>

In the third embodiment, the paving binder composition and the paving binder mixture can be used in, for example, color paving. Examples of color paving modes include, but are not particularly limited to, dense-graded pavement, drainage pavement, water-permeable pavement, dense and gap-graded asphalt pavement, crushed stone mastic asphalt pavement, semi-flexible pavement, water retaining pavement, and thin layer pavement.

Examples of production methods for obtaining each of those paving modes include, but are not particularly limited to, a high-temperature method, a medium-temperature method, and a normal-temperature method.

EXAMPLES

The present invention is now described in detail by way of specific Examples and Comparative Examples, but the present invention is not limited to these examples.
<Measurement Methods>
The methods of measuring the block copolymer and the various compositions comprising the block copolymer are described below.
(Measurement of Vinyl Content and Degree of Hydrogenation in Partially Hydrogenated Block Copolymer)

The vinyl content in the partially hydrogenated block copolymer and the degree of hydrogenation of the unsaturated bonds in the conjugated diene monomer unit were measured under the following conditions by nuclear magnetic resonance spectrometry (NMR).

A block copolymer was precipitated out and recovered by adding a large amount of methanol to a reaction solution comprising a pre-hydrogenated block copolymer. Next, the block copolymer was extracted with acetone and then vacuum dried. Using the resulting product as a sample for $^1$H-NMR measurement, the vinyl content of the block copolymer was measured.

A partially hydrogenated block copolymer was precipitated out and recovered by adding a large amount of methanol to a reaction solution comprising a partially hydrogenated block copolymer. Next, the partially hydrogenated block copolymer was extracted with acetone and then vacuum dried. Using the resulting product as a sample for $^1$H-NMR measurement, the degree of hydrogenation was measured.

The $^1$H-NMR measurement conditions were as follows.
Measuring apparatus: JNM-LA400 (manufactured by JEOL)
Solvent: Deuterochloroform
Measurement sample: Polymer taken before and after hydrogenation
Sample concentration: 50 mg/mL
Observation frequency: 400 MHz
Chemical shift reference: TMS (tetramethylsilane)
Pulse delay: 2.904 seconds
Number of scans: 64 times
Pulse width: 45°
Measurement temperature: 26° C.
(Measurement of Content (TS) of Vinyl Aromatic Monomer Unit (Styrene) in Block Copolymer)

A predetermined amount of a block copolymer was dissolved in chloroform. The peak intensity of the absorption wavelength (262 nm) attributed to the vinyl aromatic compound component (styrene) in the solvent solution was measured using an ultraviolet spectrophotometer (manufactured by Shimadzu Corporation, UV-2450). The content (TS) of the vinyl aromatic monomer unit (styrene) in the block copolymer was calculated from the obtained peak intensity by using a calibration curve.

(Measurement of Content (BS) of Polymer Block Comprising Vinyl Aromatic Monomer Unit as Main Component in Block Copolymer)

The content (BS) of the polymer block comprising a vinyl aromatic monomer unit as a main component in the block copolymer was measured using the following polymer degradation solution based on the osmium tetroxide acid degradation method described in I.M. Kolthoff, et al., J. Polym. Sci., 1946, Vol 1, p. 429.
Measurement sample: Block copolymer taken before hydrogenation
Polymer degradation solution: Solution obtained by dissolving 0.1 g of osmium tetroxide acid in 125 mL of tertiary butanol
(Method of Measuring Content of Continuous Vinyl Aromatic Monomer Units)

The above BS measurement sample was analyzed by GPC. The analysis conditions were the same as described below (measurement of weight average molecular weight (Mw) and molecular weight distribution (Mw/Mn) of block copolymer). The content of continuous vinyl aromatic monomer units was determined from the obtained molecular weight distribution.
(Measurement of Distribution of Degree of Hydrogenation H of Partially Hydrogenated Block Copolymer)

Oxygen including an ozone ($O_3$) at a concentration of 1.5% was passed through a solution of the hydrogenated block copolymer in dichloromethane at 150 mL/min to perform oxidative decomposition, and the obtained ozonide was reduced by adding it dropwise into diethyl ether mixed with lithium aluminum hydride. Next, a component comprising a vinyl aromatic hydrocarbon and a conjugated diene hydrocarbon was obtained by adding pure water dropwise to hydrolyze the mixture, then performing salting-out by adding potassium carbonate, and filtering the resultant product. A differential molecular weight distribution (B) was obtained by measuring this component by gel permeation chromatography (hereinafter also referred to as "GPC"; apparatus manufactured by Waters), and then using a calibration curve obtained from the measurement of commercially-available standard polystyrene (the calibration curve was created using the peak molecular weight of standard polystyrene). H was given by a maximum peak height in a region of a molecular weight of 800 to 3,000 in this differential molecular weight distribution (B). In other words, the larger H is, the narrower the distribution of degree of hydrogenation, and the smaller H is, the wider the distribution of degree of hydrogenation, in the region of a molecular weight of 800 to 3,000.
GPC: Waters 2695 (manufactured by Waters Corporation)
Detector: UV
Sampling pitch: 1000 msec
Column: Shodex K-803L, K801, K801 3 columns (manufactured by SHOWA DENKO K. K.)
Solvent: Chloroform
Flow rate: 1 mL/min
Concentration: 20 mg/mL
Column temperature: 40° C.
Injection amount: 50 μL
(Measurement of Distribution of Degree of Hydrogenation H2 of Partially Hydrogenated Block Copolymer)

A differential molecular weight distribution (C) was obtained by treating the hydrogenated block copolymer according to the above osmium tetroxide acid degradation method and by measuring the obtained vinyl aromatic monomer block by GPC.

H2 was given by a maximum peak height based on a total area in a region of a molecular weight of 200 or more and 1,000,000 or less of a molecular weight distribution (D) which is newly obtained by performing {(B)-(C)} for (B) and (C). In other words, the larger H2 is, the narrower the distribution of degree of hydrogenation, and the smaller H2 is, the wider the distribution of degree of hydrogenation, for the molecular weight of 200 or more and 1,000,000 or less.

(Measurement of L2/L1)

L1 is a length of a perpendicular L drawn to a baseline from an apex of a peak of a maximum molecular weight component of peaks in a differential molecular weight distribution (A) of the obtained partially hydrogenated block copolymer, and L2 is a distance on the perpendicular L between the baseline and an intersection where the differential molecular weight distribution (B) intersects the perpendicular L when the differential molecular weight distribution (B) of a degradation product of the partially hydrogenated block copolymer obtained by an ozone degradation method is superimposed on the differential molecular weight distribution (A). The differential molecular weight distribution (B) was calculated using the analysis method described above. Further, the differential molecular weight distribution (A) was calculated in the same manner as the differential molecular weight distribution (A) using the following analysis device.

GPC: HLC-8320 GPC (manufactured by Tosoh Corporation)
Detector; UV
Detector sensitivity; 3 mV/minute
Sampling pitch; 600 msec
Column; Four TSKgel super HZM-N (6 mm I.D×15 cm) (manufactured by Tosoh Corporation)
Solvent; THF
Flow rate; 0.6 mm/min
Concentration; 0.5 mg/mL
Column temperature; 40° C.
Injection amount; 20 μL (Measurement of Weight Average Molecular Weight (Mw) and Molecular Weight Distribution (Mw/Mn) of Block Copolymer)

The weight average molecular weight (Mw) of block copolymer was determined based on the molecular weight of the chromatogram peak using a calibration curve obtained from the measurement of commercially-available standard polystyrene (the calibration curve was created by using the peak molecular weight of standard polystyrene). As the measurement software, HLC-8320 EcoSEC collection was used, and as the analysis software, HLC-8320 analysis was used. Further, the molecular weight distribution (Mw/Mn) of block copolymer was determined from the ratio of the weight average molecular weight (Mw) in terms of polystyrene to the number average molecular weight (Mn). The measurement conditions are shown below.

GPC; HLC-8320 GPC (manufactured by Tosoh Corporation)
Detector; RI
Detector sensitivity; 3 mV/minute
Sampling pitch; 600 msec
Column; Four TSKgel super HZM-N (6 mm I.D×15 cm) (manufactured by Tosoh Corporation)
Solvent; THF
Flow rate; 0.6 mm/min
Concentration; 0.5 mg/mL
Column temperature; 40° C.
Injection amount: 20 μL <Viscous Adhesive Composition>

[Production of Hydrogenation Catalyst]

1 L of dried and purified cyclohexane was charged into a reactor purged with nitrogen. 100 mmol of bis (cyclopentadienyl) titanium dichloride was added, and while thoroughly stirring, an n-hexane solution comprising 200 mmol of trimethyl aluminum was added. The resulting mixture was reacted for 3 days at room temperature to produce a hydrogenation catalyst.

[Partially Hydrogenated Block Copolymer (P-1)]

(Stage 1)

43.6 kg of cyclohexane was charged into a reactor and the temperature was adjusted to 60° C. Then, a cyclohexane solution comprising 1,980 g of styrene as a monomer (monomer concentration: 22% by mass) was added over about 3 minutes, and 77 mL of n-butyllithium and 8.15 mL of N,N,N',N'-tetramethylethylenediamine (hereinafter referred to as TMEDA) were added to start the reaction.

(Stage 2)

Next, 3 minutes after the temperature in the reactor indicated a maximum value, a cyclohexane solution comprising 5,560 g of butadiene (monomer concentration: 22% by mass) was continuously supplied into the reactor at a constant rate over 6 minutes. Then, after 0.5 minutes had elapsed, 5,560 g of butadiene comprising 4.09 mL of TMEDA was continuously supplied into the reactor at a constant rate over 22 minutes and reacted. Then, 3 minutes after the temperature in the reactor indicated a maximum value, tetraethoxysilane was added as a coupling agent at a molar ratio of 0.1 based on the total number of moles of n-butyllithium, and a coupling reaction was carried out for 10 minutes to obtain a coupling polymer.

The content (TS) of the vinyl aromatic monomer unit (styrene monomer unit) and the content (BS) of the block (polystyrene block) comprising a vinyl aromatic monomer unit as a main component in the obtained coupling polymer were both 15% by mass, and the vinyl content in the conjugated diene monomer unit (vinyl content in the butadiene) was 34 mol %.

Then, using the above hydrogenation catalyst, the obtained coupling polymer was continuously hydrogenated at 80° C. to obtain a partially hydrogenated block copolymer (P-1). At that time, 80% by weight of the total of the block copolymer was continuously supplied from an upper portion of the reactor, 20% by weight of the total of the block copolymer was continuously supplied from a middle portion of the reactor, and all of the polymer was continuously extracted from a lower portion of the reactor. Further, hydrogen was continuously supplied from a lower portion of the reactor which was different from the extraction port for the block copolymer. The hydrogen pressure in the hydrogenation and polymerization vessel was 0.8 MPA, and the average retention time was 30 minutes. After completion of the reaction, a stabilizer (octadecyl-3-(3,5-di-t-butyl-4-hydroxyphenyl)propionate) was added in an amount of 0.25 parts by mass based on 100 parts by mass of the partially hydrogenated block copolymer (P-1). The degree of hydrogenation of the partially hydrogenated block copolymer (P-1) was 40 mol % and the degree-of-hydrogenation H was 0.150. Further, H2 was 0.001, and L2/L1 was 0.000365. MFR (200° C., 5 kgf) was 2.0 g/10 minutes.

The structure and composition of the partially hydrogenated block copolymer (P-1) were as follows.

(S-B): 65% by mass, Mw 90,000
$(S-B)_2-X$: 4% by mass, Mw 180,000
$(S-B)_3-X$: 8% by mass, Mw 270,000
$(S-B)_4-X$: 23% by mass, Mw 360,000

(wherein S represents a styrene block, B represents a butadiene block, and X represents a coupling agent residue (hereinafter the same).

[Production of Partially Hydrogenated Block Copolymer (P-2)]

A partially hydrogenated block copolymer (P-2) was obtained in the same manner as the partially hydrogenated block copolymer (P-1), except that the hydrogenation method was changed to a batch method. In the batch method hydrogenation, the hydrogenation reaction was started at 80° C. from a state in which all of the block copolymer had been supplied to the reactor, the hydrogen pressure in the hydrogenation and polymerization vessel was 0.8 MPa, and the reaction time was 30 minutes. The content of the vinyl aromatic monomer unit included in the partially hydrogenated block copolymer (P-2) was 15 parts by weight, the content of the polymer block comprising a vinyl aromatic monomer unit as a main component was 15 parts by weight, the degree of hydrogenation of the partially hydrogenated block copolymer B was 40 mol %, and the distribution of degree of hydrogenation H was 0.59. Further, H2 was 0.1, and L2/L1 was 0.00015. MFR (200° C., 5 kgf) was 2.0 g/10 minutes.

The structure and composition of the partially hydrogenated block copolymer (P-2) were as follows.

(S-B): 65% by mass, Mw 90,000
$(S-B)_2$-X: 4% by mass, Mw 180,000
$(S-B)_3$-X: 8% by mass, Mw 270,000
$(S-B)_4$-X: 23% by mass, Mw 360,000

[Other Materials]

In addition to the above partially hydrogenated block copolymers (P-1) and (P-2), the following block copolymers (SBS) and (SIS), tackifiers (b-1) and (b-2), oils (c-1) and (c-2), and an antioxidant were used.

Block copolymer (SBS): D1102 (non-hydrogenated block copolymer, manufactured by Kraton Corporation, polystyrene block content: 29% by mass, di-block content: 17% by mass)

Block copolymer (SIS): Quintac 3433N (manufactured by Zeon Corporation, polystyrene block content: 16% by mass, di-block content: 56% by mass)

Tackifier resin (b-1): Quintone R100 (manufactured by Zeon Corporation, polymer having C4 to C5 hydrocarbon fraction: 99% or more, softening point: 96° C., aliphatic tackifier)

Tackifier resin (b-2): Arkon M100 (manufactured by ARAKAWA CHEMICAL INDUSTRIES, LTD, softening point: 100° C., partially hydrogenated aromatic tackifier)

Oil (c-1): Diana Process Oil PW-90 (manufactured by Idemitsu Kosan Co., Ltd., paraffinic oil)

Oil (c-2): Diana Process Oil NS-90S (manufactured by Idemitsu Kosan Co., Ltd., naphthenic oil)

Antioxidant: Irganox 1010 (manufactured by BASF, phenolic antioxidant)

[Production Examples of Viscous Adhesive Composition]

The viscous adhesive compositions of Examples 1 to 6 and Comparative Examples 1 and 2 were produced by mixing partially hydrogenated block copolymer, a tackifier resin, an oil, and an antioxidant according to the composition shown in Table 1 with a propeller while heating to 170° C.

[Production Examples of Viscous Adhesive Tape]

Viscous adhesive tapes were produced according to the following method by using the viscous adhesive compositions of Examples 1 to 6 and Comparative Examples 1 and 2. The molten viscous adhesive compositions were cooled to room temperature, dissolved in toluene, and then coated using an applicator on a 50 μm-thick transparent polyethylene terephthalate (PET) film as a substrate. The coated films were then left for 30 minutes at room temperature and 7 minutes in a 70° C. oven to completely volatilize the toluene, thereby producing viscous adhesive tapes having a 30 μm-thick transparent PET film as a substrate.

<Evaluation Methods>

The viscous adhesive compositions and the viscous adhesive tapes of Examples 1 to 6 and Comparative Examples 1 and 2 were evaluated based on the following methods.

(Heat Discoloration Resistance of Viscous Adhesive Composition)

The viscous adhesive compositions obtained in the "Production examples of viscous adhesive composition" described above were each compression-molded into a 2 mm-thick sheet, and heated in a Geer oven at 180° C. for 30 minutes. The b value of each sheet before heating and after heating was measured using a color-difference meter (ZE-2000, manufactured by NIPPON DENSHOKU INDUSTRIES Co., Ltd).

A larger difference (Δb value) between the b value before heating and the b value after heating indicates a stronger yellow color hue of the polymer, thus indicating a poor color tone after heating.

The viscous adhesive compositions were evaluated from better to worse with ◯, Δ, or x based on their color tone after heating according to the following evaluation criteria.

<Evaluation Criteria>

◯: Δb value less than 3
Δ: Δb value 3 or more and less than 15
x: Δb value 15 or more (Tackiness)

Tackiness was evaluated in accordance with the ball tack test described in J. Dow [Proc. Inst. Rub. Ind., 1.105 (1954)]. A viscous adhesive tape cut to a length of 10 cm was attached onto an inclined surface of a glass plate having an inclination angle of 30 degrees with the viscous adhesive layer surface turned up. From a position 10 cm upward from the top end of the viscous adhesive tape on the inclined surface, 32 differently sized types of stainless steel balls having a diameter of 1/32 inches to 1 inch were allowed to roll at an initial velocity of 0. The size of ball having the largest diameter that stopped on the adhesive tape was measured. Ball tack was evaluated based on the size of the ball in accordance with the following evaluation criteria. The evaluation was carried out by determining that if the size of the ball having the largest diameter that stopped on the viscous adhesive tape was more than 7/32 inches, then that viscous adhesive tape could be used as a viscous adhesive composition in practice without problems, and was thus evaluated as "◯". If the size of the ball having the largest diameter that stopped on the viscous adhesive tape was more than 4/32 inches and less than 7/32 inches, the viscous adhesive tape was evaluated as "Δ". If the size of the ball having the largest diameter that stopped on the viscous adhesive tape was 4/32 inches or less, the viscous adhesive tape was evaluated as "x".

7/32 inches<ball size: ◯
4/32 inches<ball size≤7/32 inches: Δ
ball size≤4/32 inches: x (Evaluation of Tack Strength of Viscous Adhesive Composition)

Tack strength was measured in accordance with peel tack strength measurement method 1 of JIS 20237: a measurement method for 180° peel tack strength against a test plate. First, the viscous adhesive tapes obtained in the "Production examples of viscous adhesive tape" described above were cut into 25 mm widths to produce 25 mm-wide viscous adhesive tape samples. The viscous adhesive tape samples were attached to a stainless steel plate, and the 180° peel strength at a peel speed of 300 mm/min was measured. The tack strength of the viscous adhesive compositions was evaluated from better to worse with ⊚, ○, Δ, or x based on their peel strength according to the following evaluation criteria. An evaluation of Δ or better indicates that the viscous adhesive composition can be used in practice without problems.
Peel strength (N/10 mm) 6 or more: ○
  5 or more and less than 6: Δ
  Less than 5: x
(Evaluation of Tack Holding Power of Viscous Adhesive Composition]
The viscous adhesive tapes obtained in the "Production examples of viscous adhesive tape" described above were cut into 25 mm-long, 15 mm-wide viscous adhesive tape samples. The viscous adhesive tape samples were attached to a stainless steel plate, the stainless steel plate was turned vertically upright, a 1 kg load was applied in the vertically downward direction at 50° C., and the time that it took for the viscous adhesive tape to slip down was measured. The tack holding power of the viscous adhesive compositions was evaluated from better to worse with ○, Δ, or x according to the following evaluation criteria. An evaluation of Δ or better indicates that the viscous adhesive composition can be used in practice without problems.
Tack holding power (min) 10 min or more: ○
  5 min or more and less than 10 min: Δ
  Less than 5 min: x

[Production of Partially Hydrogenated Block Copolymer (Q-1)]
Polymerization was carried out based on the following method using a tank reactor having an internal volume of 100 L and equipped with a stirring device and a jacket.
(Stage 1)
43.6 kg of cyclohexane was charged into a reactor and the temperature was adjusted to 60° C. Then, a cyclohexane solution (monomer concentration: 22% by mass) comprising 990 g of styrene as a monomer was added over about 3 minutes, and 38.5 mL of n-butyllithium and 4.09 mL of N,N,N',N'-tetramethylethylenediamine (hereinafter referred to as TMEDA) were added to start the reaction.
(Stage 2)
Next, 3 minutes after the temperature in the reactor indicated a maximum value, a cyclohexane solution comprising 2,700 g of styrene (monomer concentration: 22% by mass) was continuously supplied into the reactor at a constant rate over 2 minutes. Then, a cyclohexane solution comprising 5,360 g of butadiene (monomer concentration: 22% by mass) was continuously supplied into the reactor at a constant rate over 6 minutes. Then, after 0.5 minutes had elapsed, 5,360 g of butadiene comprising 4.09 mL of TMEDA was continuously supplied into the reactor at a constant rate over 22 minutes to start the reaction.
(Stage 3)
Then, 5 minutes after the temperature in the reactor reached a maximum temperature, a cyclohexane solution comprising 810 g of styrene as a monomer (monomer concentration: 22% by mass) was added over about 1 minute, and the resultant mixture was held for 5 minutes.

TABLE 1

| Blending ratio (parts by mass) | | Example 1 | Example 2 | Example 3 | Example 4 | Example 5 | Example 6 | Comparative Example 1 | Comparative Example 2 |
|---|---|---|---|---|---|---|---|---|---|
| Partially hydrogenated block copolymer | P-1 | 100 | 75 | 50 | 100 | 70 | 70 | 25 | |
| | P-2 | | 25 | 50 | | | | 75 | 100 |
| SBS | | | | | | | 30 | | |
| SIS | | | | | | 30 | | | |
| Tackifier resin | b-1 | | | | 200 | | | | |
| | b-2 | 200 | 200 | 200 | | 200 | 200 | 200 | 200 |
| Oil | c-1 | 100 | 100 | 100 | 50 | 100 | 100 | 100 | 100 |
| | c-2 | | | | 50 | | | | |
| Antioxidant | Irganox 1010 | 2 | 2 | 2 | 2 | 2 | 2 | 2 | 2 |
| Evaluation of viscous adhesive composition | Heat discoloration resistance | ○ | ○ | ○ | ○ | Δ | ○ | X | ○ |
| | Tackiness | ○ | ○ | Δ | ○ | ○ | ○ | X | X |
| | Tack strength | ○ | Δ | Δ | ○ | ○ | ○ | ○ | ○ |
| | Tack holding power | ○ | ○ | ○ | ○ | ○ | ○ | ○ | X |

<Modified Asphalt Composition and Paving Binder Composition>
[Production of Hydrogenation Catalyst]

1 L of dried and purified cyclohexane was charged into a reactor purged with nitrogen. 100 mmol of bis (cyclopentadienyl) titanium dichloride was added, and while thoroughly stirring, an n-hexane solution comprising 200 mmol of trimethyl aluminum was added. The resulting mixture was reacted for about 3 days at room temperature to produce a hydrogenation catalyst.

Next, after completion of the reaction, 3.5 mL of methanol was added to obtain a block copolymer.
(Hydrogenation Step)
Then, using the above hydrogenation catalyst, the obtained block copolymer was continuously hydrogenated at 80° C. to obtain a partially hydrogenated block copolymer (Q-1). At that time, 80% by weight of the total of the block copolymer was continuously supplied from an upper portion of the reactor, 20% by weight of the total of the block copolymer was continuously supplied from a middle portion of the reactor, and all of the polymer was continuously extracted from a lower portion of the reactor. Further, hydrogen was continuously supplied from a lower portion of the reactor which was different from the extraction port for the block copolymer. The hydrogen pressure in the hydrogenation and polymerization vessel was 1.2 MPa, and the average retention time was 60 minutes.

After completion of the hydrogenation step, a stabilizer (octadecyl-3-(3,5-di-t-butyl-4-hydroxyphenyl)propionate) was added in an amount of 0.25 parts by mass based on 100 parts by mass of the partially hydrogenated block copolymer (Q-1).

Figure 2:
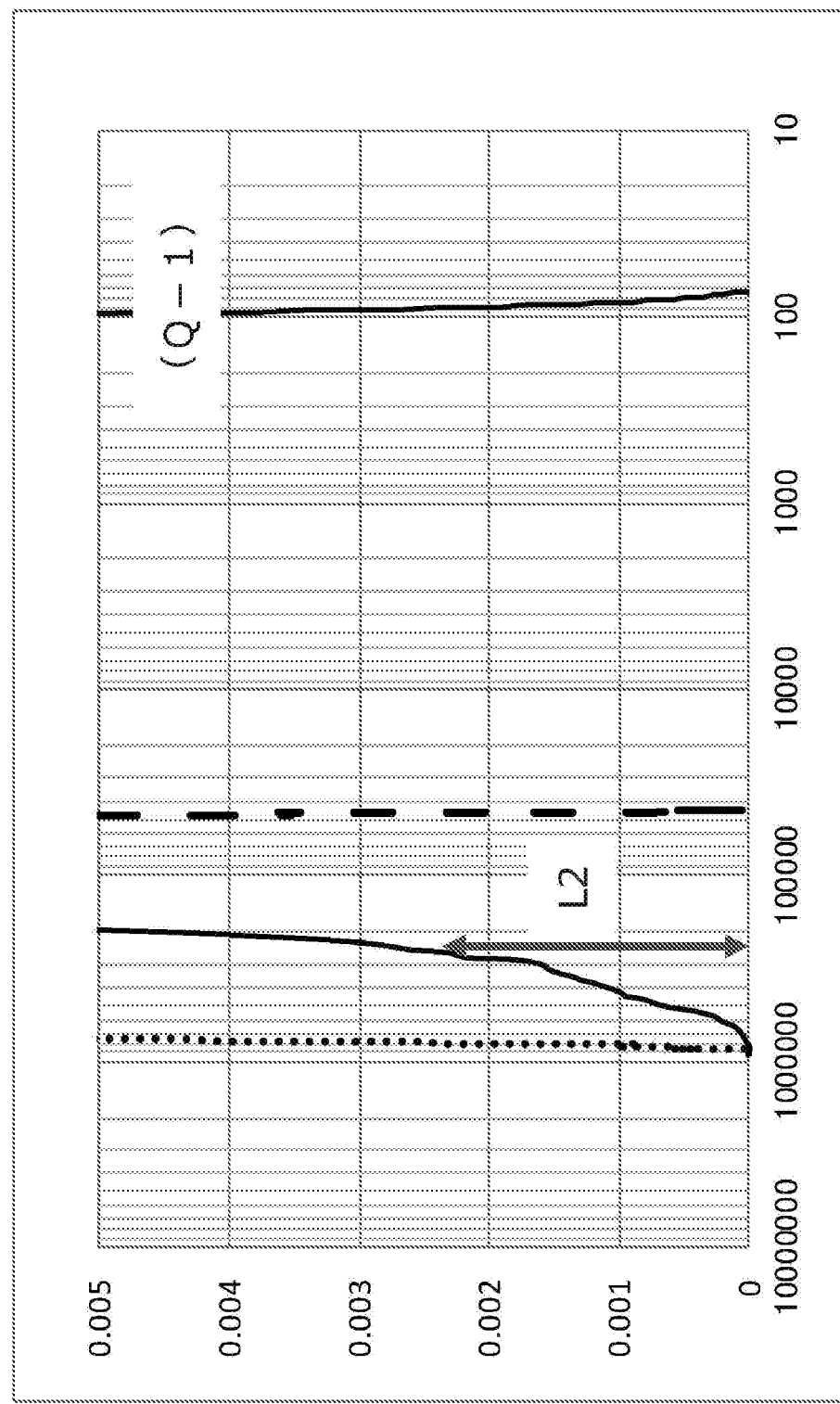
FIG. 2 illustrates a graph showing an enlarged part of FIG. 1 in order to illustrate L2.

In the partially hydrogenated block copolymer (Q-1), the content of the vinyl aromatic monomer unit was 45% by mass, the content of the polymer block comprising a vinyl aromatic monomer unit as a main component was 30% by mass, the average vinyl content in the pre-hydrogenated conjugated diene monomer unit was 25 mol %, the degree of hydrogenation was 90 mol %, and the distribution of degree of hydrogenation H was 0.186. Further, H2 was 0.001, and L2/L1 was 0.000365. The molecular weight distribution measured in order to determine H and L2/L1 is shown in FIGS. 1 and 2. In these figures, the differential molecular weight distribution (A) before ozone degradation is shown by the dashed line, and the differential molecular weight distribution (B) after ozone degradation is shown by the solid line. The peak temperature of the loss tangent (tan δ) obtained by measuring the dynamic viscoelasticity of the partially hydrogenated block copolymer (Q-1) was −14° C., the tan δ peak height thereof was 1.7, and the weight average molecular weight (Mw) was 200,000. It is noted that the peak temperature and the peak height of the loss tangent (tan δ) were determined by the following method.

(Peak Temperature and Peak Height of Loss Tangent (tan δ))

The dynamic viscoelastic spectrum was measured by the following method to obtain the peak temperature and the peak height of the loss tangent (tan δ). The measurement was performed using an apparatus ARES (trade name, manufactured by TAInstruments) in torsion type geometry under the conditions of a sample thickness of 2 mm, width of 10 mm, length of 20 mm, strain (initial strain) of 0.5%, at a frequency of 1 Hz, a measurement range from −100° C. to 100° C., and a rate of temperature increase of 3° C./minute.

[Production of Partially Hydrogenated Block Copolymer (Q-2)]

Figure 3:
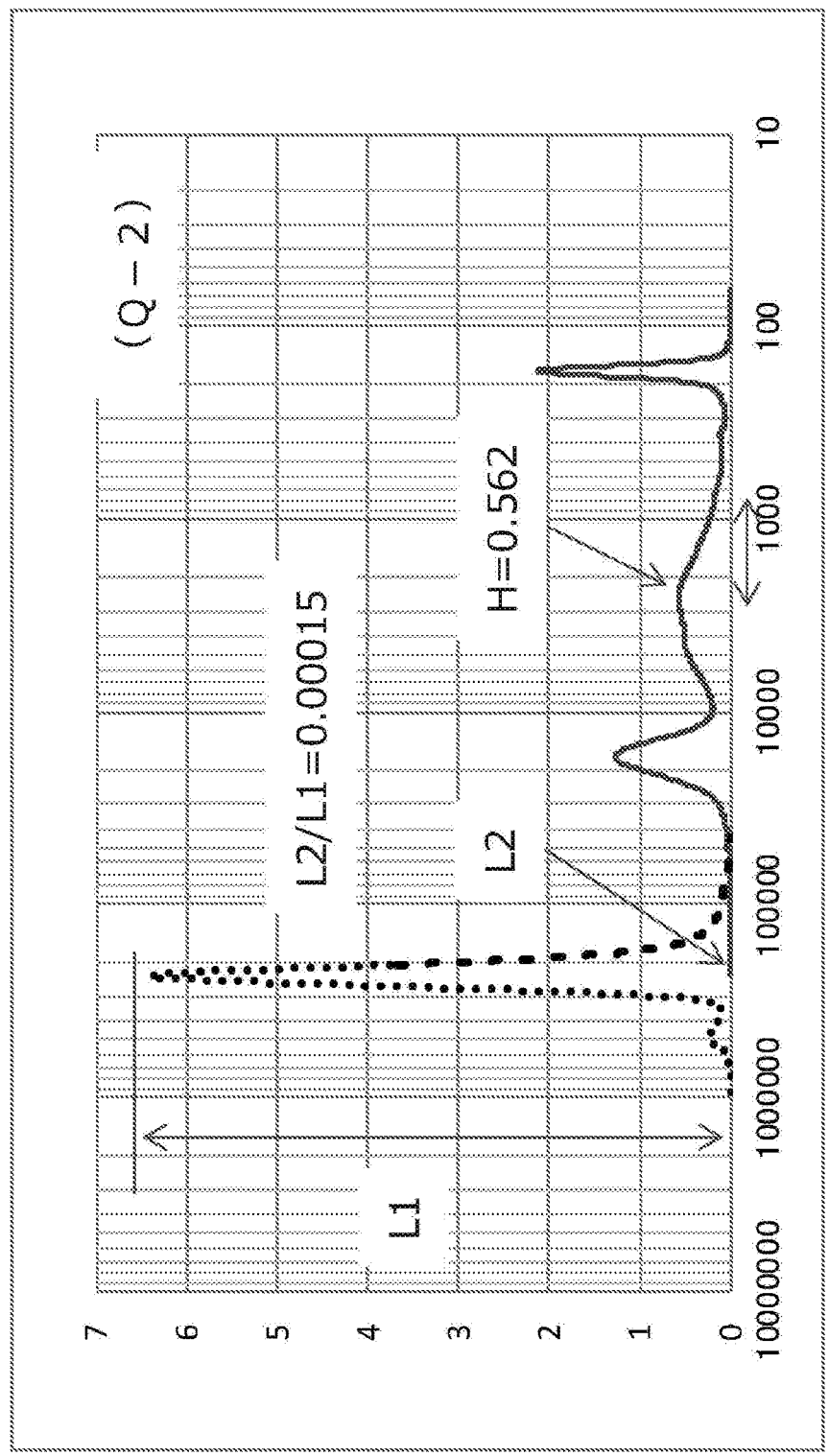
FIG. 3 illustrates a graph showing the result of measuring the molecular weight distribution of a partially hydrogenated block copolymer Q-2 obtained in Example.

A partially hydrogenated block copolymer (Q-2) was obtained in the same manner as the production of the partially hydrogenated block copolymer (Q-1), except that the hydrogenation method was changed to a batch method. In the batch method hydrogenation, the hydrogenation reaction was started at 80° C. from a state in which all of the block copolymer had been supplied to the reactor, the hydrogen pressure in the hydrogenation and polymerization vessel was 1.2 MPa, and the reaction time was 60 minutes. In the partially hydrogenated block copolymer (Q-2), the content of the vinyl aromatic monomer unit was 45% by mass, the content of the polymer block comprising a vinyl aromatic monomer unit as a main component was 30% by mass, the average vinyl content in the pre-hydrogenated conjugated diene monomer unit was 25 mol %, the degree of hydrogenation was 89 mol %, and the distribution of degree of hydrogenation H was 0.562. H2 was 0.01, and L2/L1 was 0.00015. The molecular weight distribution measured in order to determine H and L2/L1 is shown in FIG. 3. In this figure, the differential molecular weight distribution (A) before ozone degradation is shown by the dashed line, and the differential molecular weight distribution (B) after ozone degradation is shown by the solid line. The peak temperature of the loss tangent (tan δ) obtained by measuring the dynamic viscoelasticity of the partially hydrogenated block copolymer (Q-2) was −14° C., the tan δ peak height thereof was 1.7, and the weight average molecular weight was 200,000.

Examples 7 to 11 and Comparative Examples 3 and 4

(Preparation of Modified Asphalt Composition)

A 750 mL-metal can was charged with 500 g of asphalt (straight asphalt 60-80 (manufactured by Nippon Oil Corporation)), and the metal can was thoroughly dipped in a 180° C. oil bath. Next, the partially hydrogenated block copolymers, SBS, and SIS were each gradually charged in the ratios shown in Table 2 into the molten asphalt while stirring. After each of the materials had been completely charged, a modified asphalt composition was prepared by stirring for 60 minutes at a rate of 3,000 rpm. The blending compositions and the evaluation results of the modified asphalt compositions are shown in Table 2.

It is noted that the following block copolymers were used as the SBS and the SIS.

Block copolymer (SBS): D1102 (non-hydrogenated block copolymer, manufactured by Kraton Corporation, polystyrene block content: 29% by mass, di-block content: 17% by mass)

Block copolymer (SIS): Quintac 3433N (manufactured by Zeon Corporation, polystyrene block content: 16% by mass, di-block content: 56% by mass)

Examples 12 to 14 and Comparative Examples 5 and 6

(Preparation of Color Paving Composition)

A 750 mL-metal can was charged with 160 g of tackifier resin (trade name, Aimabu P-125 (manufactured by Idemitsu Kosan Co., Ltd., softening point 125° C., DCPD/aromatic copolymer-based hydrogenated petroleum resin)) and 208 g of an oil (mineral heavy oil having a polycyclic aromatic hydrocarbon content of 1.9% by mass, an aromatic content of 9%, a kinematic viscosity at 40° C. of 480 mm$^2$/s, and a flash point of 310° C.), and the metal can was thoroughly dipped in a 180° C. oil bath. Next, the partially hydrogenated block copolymers were each gradually charged in the ratios shown in Table 3 into the mixture of the molten tackifier resin and the oil while stirring. After each of the materials had been completely charged, a paving binder composition was prepared by stirring for 60 minutes at a rate of 3,000 rpm. The blending compositions and the evaluation results of the paving binder compositions are shown in Table 3.

Examples 15 to 17 and Comparative Examples 7 and 8

(Preparation of Compostion for Asphalt Waterproofing Sheet)

A 750 mL-metal can was charged with 400 g of asphalt (straight asphalt 100-150 (manufactured by Nippon Oil Corporation)), and the metal can was thoroughly dipped in a 180° C. oil bath. Next, the partially hydrogenated block copolymers and a naphthenic oil (mineral heavy oil having a polycyclic aromatic hydrocarbon content of 1.9% by mass, an aromatic content of 9%, a kinematic viscosity at 40° C. of 480 mm$^2$/s, and a flash point of 310° C., Diana Process Oil NS90S) were each gradually charged in the ratios shown in Table 4 into the molten asphalt while stirring. After each of the materials had been completely charged, a composition for an asphalt waterproofing sheet was prepared by stirring for 90 minutes at a rate of 3,000 rpm. The blending compositions and the evaluation results of the compositions for asphalt waterproofing sheet are shown in Table 4.

<Evaluation Methods>

The modified asphalt compositions and the paving binder compositions were evaluated as follows.

(Softening Point of Modified Asphalt Composition and Paving Binder Composition (Ring and Ball Method))

The softening point of the modified asphalt compositions and the paving binder compositions was measured according to JIS-K2207. A sample was filled into a specified ring. The ring was held horizontally in a glycerin solution. A 3.5 g ball was placed on the center of the sample. The temperature of the solution was raised at a rate of 5° C/min. When the sample touched the bottom plate of the ring holder due to the weight of the ball, the temperature was measured.

80° C. or more: ◉
70° C. or more and less than 80° C.: ○
60° C. or more and less than 70° C.: Δ
50° C. or more and less than 60° C.: x
Less than 50° C.: xx When the measurement value is 60° C. or more (Δ or better), the modified asphalt composition and the paving binder composition can be used in practice without problems.

(Low-temperature Ductility of Modified Asphalt Compostion and Paving Binder Composition)

Low-temperature ductility was measured according to JIS-K2207. A sample was poured into a frame to prepare a sample having a predetermined shape. While the sample was kept at 15° C. in a thermostat water bath, the sample was pulled at a rate of 5 cm/min until the sample broke, and the length of elongation of the sample at this time was measured.

100 cm or more: ◉
75 cm or more and less than 100 cm: ○
50 cm or more and less than 75 cm: Δ
30 cm or more and less than 50 cm: x
Less than 30 cm: x When the measurement value is 50 cm or more (Δ or better), the modified asphalt composition and the paving binder composition can be used in practice without problems.

(Melt Viscosity of Modified Asphalt Composition and Paving Binder Composition)

Melt viscosity was measured at a measurement temperature of 180° C. with a Brookfield viscometer.

Less than 200 mPa·s: ◉
200 mPa·s or more and 300 mPa·s or less: ○
300 mPa·s or more and less than 400 mPa·s: Δ
400 mPa·s or more and less than 500 mPa·s: x
500 mPa·s or more: xx When the measurement value is less than 400 mPa·s (Δ or better), the modified asphalt composition and the paving binder composition can be used in practice without problems.

(Rutting Resistance of Modified Asphalt Cmposition and Paving Binder Composition: G*/sin δ)

Dynamic viscoelasticity was measured using a dynamic shear rheometer. Based on the obtained complex modulus (G*) and sin δ, G*/sin δ was determined as an evaluation index for the rutting resistance of the modified asphalt composition and the paving binder composition. It is noted that the measurement apparatus and the measurement conditions were as follows.

Measurement apparatus: ARES manufactured by Rheometric Scientific
Measurement Conditions
Measurement temperature: 60° C.
Angular velocity: 10 rad/sec
Measurement mode: Parallel plates (diameter 50 mmφ)
Sample amount: 2 g
Evaluation Criteria
G*/sin δ of 5,000 Pa or more: ◉
4,000 Pa or more and less than 5,000 Pa: ○
3,000 Pa or more and less than 4,000 Pa: Δ
2,000 Pa or more and less than 3,000 Pa: x
Less than 2,000 Pa: x When G*/sin δ is 3,000 mPa·s or more (Δ or better), the modified asphalt composition and the paving binder composition can be used in practice without problems.

(Heat Resistance Stability During Storage of Modified Asphalt Composition and Paving Binder Composition: Separation Characteristics)

Immediately after being produced, the modified asphalt composition was poured into an aluminum can having an inner diameter of 50 mm and a height of 130 mm up to the top of the aluminum can. The aluminum can was heated in a 180° C. oven for 24 hours. The aluminum can was then removed from the oven, and allowed to cool naturally. Next, a sample was taken 4 cm from the bottom edge and 4 cm from the top edge of the modified asphalt composition, which had cooled to room temperature. The softening point of upper layer portion and the lower layer portion was measured. The difference in those softening points was employed as an index of high-temperature storage stability. The smaller the difference in softening point between the upper layer portion and the lower layer portion, the better the heat resistance stability during storage. The paving binder composition was also evaluated in the same manner.

Difference in softening point between upper layer portion and lower layer portion of less than 2° C.: ◉
2° C. or more and less than 5° C.: ○
5° C. or more and less than 10° C.: Δ
10° C. or more and less than 20° C.: x
20° C. or more: xx When the difference in softening point between the upper layer portion and the lower layer portion is less than 10° C. (Δ or better), the modified asphalt composition and the paving binder composition can be used in practice without problems.

(Heat Discoloration Resistance of Paving Binder Composition)

The color after viscous adhesive composition mixing was measured using EZ-2000 (manufactured by NIPPON DENSHOKU INDUSTRIES Co., Ltd.), and evaluated as follows.

The b value (b value after viscous adhesive composition mixing) obtained using the color-difference meter:
Within 2: ◉
2 or more and less than 5: ○
5 or more and less than 8: Δ
8 or more and less than 10: x
10 or more: xx When the b value is less than 5 (○ or better), the paving binder composition can be used in practice without problems.

(Softening Point of Composition for Asphalt Waterproofing Sheet (Ring and Ball Method))

Softening point of the composition was measured according to JIS-K2207. A sample was filled into a specified ring. The ring was held horizontally in a glycerin solution. A 3.5 g ball was placed on the center of the sample. The temperature of the solution was raised at a rate of 5° C./min. When the sample touched the bottom plate of the ring holder due to the weight of the ball, the temperature was measured.
130° C. or more: ⊚
120° C. or more and less than 130° C.: ◯
110° C. or more and less than 120° C.: Δ
100° C. or more and less than 110° C.: x
Less than 100° C.: xx When the measurement value is 110° C. or more (Δ or better), the composition for an asphalt waterproofing sheet can be used in practice without problems.

(Melt Viscosity of Composition for Asphalt Waterproofing Sheet)

Melt viscosity was measured at a measurement temperature of 180° C. with a Brookfield viscometer.
Less than 1000 mPa·s: ⊚
1000 mPa·s or more and 1500 mPa·s or less: ◯
1500 mPa·s or more and less than 2000 mPa·s: Δ
2000 mPa·s or more and less than 2500 mPa·s: x
2500 mPa·s or more: xx When the measurement value is less than 2000 mPa·s (Δ or better), the composition for asphalt waterproofing sheet can be used in practice without problems.

(Low-temperature Bending Properties of Composition for Asphalt Waterproofing Sheet)

The composition for an asphalt waterproofing sheet was pressed at 150° C. into a 2 mm-thick sheet. The sheet was cut to a size of 20 mm×100 mm, dipped for 10 minutes or more in a temperature-adjusted dry ice-ethanol solution, and then removed. Immediately after being removed, the sheet was wrapped in a longitudinal direction of the sheet around a metal rod having a diameter of 20 mm, and visually observed for any cracking and splitting of the sheet. The minimum temperature of the dry ice-ethanol solution at which sheet cracking and splitting did not occur was measured.
−25° C. or less: ⊚
−20° C. or less and more than −25° C.: ◯
−15° C. or less and more than −20° C.: Δ
−10° C. or less and more than −15° C.: x
More than −10° C.: xx When the temperature at which sheet cracking and splitting does not occur is −15° C. or less (Δ or better), the composition for asphalt waterproofing sheet can be used in practice without problems.

TABLE 2

| Blending ratio (parts by mass) | | Example 7 | Example 8 | Example 9 | Example 10 | Example 11 | Comparative Example 3 | Comparative Example 4 |
|---|---|---|---|---|---|---|---|---|
| Partially hydrogenated block copolymer | Q-1 | 3.5 | 3.0 | 3.0 | 2.0 | 1.75 | 0.9 | |
| | Q-2 | | | | 1.5 | 1.75 | 2.6 | 3.5 |
| | SBS | | 1 | | | | | |
| | SIS | | | 1 | | | | |
| | Asphalt | 100 | 100 | 100 | 100 | 100 | 100 | 100 |
| Evaluation of modified asphalt composition | Softening point | ◯ | ⊚ | ⊚ | ◯ | Δ | Δ | Δ |
| | Low-temperature ductility | ⊚ | ⊚ | ◯ | ⊚ | ⊚ | ◯ | ◯ |
| | Melt viscosity | ◯ | Δ | Δ | ⊚ | ⊚ | ⊚ | ⊚ |
| | Rutting resistance | ◯ | ⊚ | ◯ | ◯ | ◯ | X | X |
| | High-temperature storage stability | ⊚ | Δ | Δ | ⊚ | ◯ | Δ | X |

TABLE 3

| Blending ratio (parts by mass) | | Example 12 | Example 13 | Example 14 | Comparative Example 5 | Comparative Example 6 |
|---|---|---|---|---|---|---|
| Partially hydrogenated block copolymer | Q-1 | 8 | 6 | 4 | 1.5 | |
| | Q-2 | | 2 | 4 | 7.5 | 8 |
| | Tackifier resin | 40 | 40 | 40 | 40 | 40 |
| | Oil | 52 | 52 | 52 | 52 | 52 |
| Evaluation of paving binder composition | Softening point | ◯ | ◯ | Δ | Δ | Δ |
| | Low-temperature ductility | ⊚ | ⊚ | ⊚ | ◯ | ◯ |
| | Melt viscosity | ◯ | ⊚ | ⊚ | ⊚ | ⊚ |
| | Rutting resistance | ◯ | ◯ | ◯ | Δ | X |
| | Heat resistance stability | ⊚ | ⊚ | ◯ | X | X |
| | Heat discoloration resistance | Δ | ◯ | ◯ | ◯ | ◯ |

TABLE 4

| Blending ratio (parts by mass) | | Example 15 | Example 16 | Example 17 | Comparative Example 7 | Comparative Example 8 |
|---|---|---|---|---|---|---|
| Partially hydrogenated block copolymer | Q-1 | 8 | 6 | 4 | 0.8 | |
| | Q-2 | | 2 | 4 | 7.2 | 8 |
| | Asphalt | 89.5 | 89.5 | 89.5 | 89.5 | 89.5 |
| | Oil | 2.5 | 2.5 | 2.5 | 2.5 | 2.5 |
| Evaluation of composition for asphalt waterproofing sheet | Softening point | ○ | ○ | Δ | Δ | X |
| | Melt viscosity | ○ | ○ | ◎ | ◎ | ◎ |
| | Low-temperature bending properties | ◎ | ○ | Δ | X | X |

The present application is based on a Japanese patent application (Japanese Patent Application No. 2015-142436) filed on Jul. 16, 2015, the contents of which are incorporated herein by reference.

INDUSTRIAL APPLICABILITY

The partially hydrogenated block copolymer of the present invention can be used in industrial applications including, but not limited to, a viscous adhesive composition, a modified asphalt composition, and a paving binder composition.

The viscous adhesive composition of the present invention can be used in industrial applications including, but not limited to, various types of viscous adhesive tapes and labels, pressure-sensitive thin boards, pressure-sensitive sheets, surface protecting sheets and films, backing adhesives for fixing light-weight plastic molded articles, backing adhesives for fixing carpet, backing adhesives for fixing tiles, adhesives, sealing agents, masking agents used during repainting paint, sanitary goods, and the like.

The modified asphalt composition of the present invention can be used in industrial applications including, but not limited to, road paving, roofing, an asphalt waterproofing sheet, sealants, and the like. In particular the modified asphalt composition can be suitably used in the field of road paving.

The paving binder composition of the present invention can be industrially used in color paving applications.

The invention claimed is:

1. A partially hydrogenated block copolymer comprising: a polymer block (A) comprising a vinyl aromatic monomer unit as a main component; and a polymer block (B) comprising a conjugated diene monomer unit,
wherein in a differential molecular weight distribution (B) of a degradation product of the partially hydrogenated block copolymer obtained by an ozone degradation method, a distribution of degree of hydrogenation H, which is given by a maximum peak height in a region of a molecular weight of 800 or more and 3,000 or less, is 0.01 to 0.5.

2. The partially hydrogenated block copolymer according to claim 1, wherein in a differential molecular weight distribution (D) obtained by subtracting, from the differential molecular weight distribution (B), a differential molecular weight distribution (C) of a degradation product of the partially hydrogenated block copolymer obtained by an osmic acid degradation method, a distribution of degree of hydrogenation H2, which is given by a maximum peak height based on a total area in a region of a molecular weight of 200 or more and 1,000,000 or less, is 0.001 to 0.007.

3. The partially hydrogenated block copolymer according to claim 1, wherein the partially hydrogenated block copolymer has a degree of hydrogenation of 95 mol % or less based on a total number of moles of the conjugated diene monomer unit.

4. The partially hydrogenated block copolymer according to claim 1, wherein the partially hydrogenated block copolymer has a degree of hydrogenation of 10 mol % or more based on a total number of moles of the conjugated diene monomer unit.

5. The partially hydrogenated block copolymer according to claim 1,
wherein L2/L1 is less than 0.02, wherein
L1 is a length of a perpendicular L drawn to a baseline from an apex of a peak that is a peak in a differential molecular weight distribution (A) of the partially hydrogenated polymer and that corresponds to a maximum molecular weight component, and
L2 is a distance on the perpendicular L between the baseline and an intersection where the differential molecular weight distribution (B) intersects the perpendicular L when the differential molecular weight distribution (B) is superimposed on the differential molecular weight distribution (A).

6. The partially hydrogenated block copolymer according to claim 1, wherein the partially hydrogenated block copolymer has a vinyl aromatic monomer unit content of 10 to 60% by mass.

7. The partially hydrogenated block copolymer according to claim 1, wherein the partially hydrogenated block copolymer comprises a partially hydrogenated block copolymer (d1) comprising: one polymer block (A1) comprising a vinyl aromatic monomer unit as a main component; and one polymer block (B1) comprising a conjugated diene monomer unit as a main component.

8. The partially hydrogenated block copolymer according to claim 7, wherein a content of the partially hydrogenated block copolymer (d1) is 20 to 80% by mass based on 100% by mass of the partially hydrogenated block copolymer.

9. The partially hydrogenated block copolymer according to claim 7, wherein the partially hydrogenated block copolymer comprises a partially hydrogenated block copolymer (r1) having a radial structure.

10. A viscous adhesive composition comprising 100 parts by mass of the partially hydrogenated block copolymer according to claim 1 and 20 to 400 parts by mass of a tackifier resin.

11. A viscous adhesive tape comprising the viscous adhesive composition according to claim 10.

12. A label comprising the viscous adhesive composition according to claim 10.

13. The partially hydrogenated block copolymer according to claim 1, wherein the partially hydrogenated block copolymer comprises a partially hydrogenated block copolymer (d2) comprising: a polymer block (A) comprising a vinyl aromatic monomer unit as a main component; and a copolymer block (B2) comprising a conjugated diene monomer unit and a vinyl aromatic monomer unit.

14. The partially hydrogenated block copolymer according to claim 13, wherein the partially hydrogenated block copolymer has a weight average molecular weight (Mw) of 100,000 to 500,000.

15. The partially hydrogenated block copolymer according to claim 13, wherein a peak temperature of a loss tangent (tan δ) obtained by dynamic viscoelasticity measurement of the partially hydrogenated block copolymer is −50° C. or more and −5° C. or less.

16. The partially hydrogenated block copolymer according to claim 13, wherein a peak temperature of a loss tangent (tan δ) obtained by dynamic viscoelasticity measurement of the partially hydrogenated block copolymer is −50° C. or more and −5° C. or less, and a peak height value thereof is more than 0.7 and 1.6 or less.

17. A modified asphalt composition comprising 1 part by mass or more and 20 parts by mass or less of the partially hydrogenated block copolymer according to claim 1, based on 100 parts by mass of asphalt.

18. A modified asphalt mixture comprising the modified asphalt composition according to claim 17 and an aggregate.

19. A paving binder composition comprising:
- 20 to 70% by mass of a tackifier resin;
- 20 to 70% by mass of oil; and
- 2 to 15% by mass of the partially hydrogenated block copolymer according to claim 1.

* * * * *